United States Patent
Mueck et al.

(10) Patent No.: US 11,528,615 B2
(45) Date of Patent: Dec. 13, 2022

(54) SPECTRUM SHARING CONTROLLER AND SPECTRUM SHARING TECHNIQUES

(71) Applicant: Intel Corporation, Santa Clara, CA (US)

(72) Inventors: Markus Dominik Mueck, Unterhaching (DE); Madhusudana Raghupatruni, Bangalore (IN); Punit Rathod, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/632,724

(22) PCT Filed: Aug. 24, 2018

(86) PCT No.: PCT/US2018/047892
§ 371 (c)(1),
(2) Date: Jan. 21, 2020

(87) PCT Pub. No.: WO2019/067120
PCT Pub. Date: Apr. 4, 2019

(65) Prior Publication Data
US 2021/0153029 A1 May 20, 2021

(30) Foreign Application Priority Data
Sep. 29, 2017 (EP) ...................... 17194175

(51) Int. Cl.
*H04W 16/14* (2009.01)
(52) U.S. Cl.
CPC .................. *H04W 16/14* (2013.01)

(58) Field of Classification Search
CPC ... H04W 72/082; H04W 72/10; H04W 28/26; H04W 72/0446; H04W 16/14
See application file for complete search history.

(56) References Cited

U.S. PATENT DOCUMENTS

| 2013/0273953 A1 | 10/2013 | Srikanteswara et al. |
| 2014/0080595 A1 | 3/2014 | Suga et al. |

(Continued)

FOREIGN PATENT DOCUMENTS

| EP | 3185604 A1 | 6/2017 |
| WO | WO-2015/048756 A1 | 4/2015 |

(Continued)

OTHER PUBLICATIONS

European Patent Office, EPO Search Report issued for EP 17194175, 4 pgs., dated Mar. 15, 2018.

(Continued)

*Primary Examiner* — Dai Phuong
(74) *Attorney, Agent, or Firm* — Banner & Witcoff Ltd.

(57) ABSTRACT

A spectrum Sharing Controller comprises: an interface to a sharable spectrum, wherein the sharable spectrum is assigned to a first hierarchy level; a processor configured to enable a first entity for accessing at least part of the sharable spectrum on the first hierarchy level, wherein the processor is configured to assign a second hierarchy level to the at least part of the sharable spectrum accessible to the first entity, and wherein the processor is configured to enable a second entity for accessing at least part of the sharable spectrum on the second hierarchy level.

21 Claims, 16 Drawing Sheets

(56) References Cited

U.S. PATENT DOCUMENTS

| | | | |
|---|---|---|---|
| 2014/0237547 A1 | 8/2014 | Bose | |
| 2015/0049708 A1* | 2/2015 | Damnjanovic | H04L 1/1835 |
| | | | 370/329 |
| 2015/0173100 A1* | 6/2015 | Aydin | H04W 72/1263 |
| | | | 370/329 |
| 2015/0223069 A1* | 8/2015 | Solondz | H04L 1/00 |
| | | | 370/329 |
| 2015/0358968 A1* | 12/2015 | Malladi | H04W 16/14 |
| | | | 455/454 |
| 2015/0373554 A1* | 12/2015 | Freda | H04W 16/14 |
| | | | 455/450 |
| 2017/0208476 A1 | 7/2017 | Khambekar et al. | |
| 2017/0257773 A1* | 9/2017 | Boudreau | H04W 72/0453 |
| 2019/0069201 A1* | 2/2019 | Hassan | H04W 16/14 |
| 2019/0132853 A1* | 5/2019 | Mitola, III | H04M 15/8235 |
| 2020/0229191 A1* | 7/2020 | Bhushan | H04W 16/14 |

FOREIGN PATENT DOCUMENTS

| | | |
|---|---|---|
| WO | WO-2015/057811 A2 | 4/2015 |
| WO | WO-2015/084959 A1 | 6/2015 |
| WO | WO-2016/195751 A1 | 12/2016 |

OTHER PUBLICATIONS

PCT International Search Authority, PCT Search Report issued for PCT/US2018/047892, 4 pgs., dated Dec. 7, 2018.

\* cited by examiner

SPECTRUM SHARING CONTROLLER AND SPECTRUM SHARING TECHNIQUES

FIELD

The disclosure relates to a spectrum sharing controller and spectrum sharing techniques. The disclosure provides an architecture and methodology for efficiently sharing the spectrum among multiple independently operating networks using a spectrum sharing system such as Spectrum Access System (SAS) or License Shared Access System (LSA), for example. In particular, the disclosure relates to spectrum sharing methods within SAS priority access users.

BACKGROUND

Spectrum Access System (SAS) is a tiered static allocation scheme based on database lookups to share the spectrum. The first tier is owned by the Incumbent. They are current users of the spectrum who can use it without any limitations. They get interference protection from the lower two tiers. The second tier is the Priority Access (PA): This is similar to the licensed spectrum that can be won in an auction. However the PA have to vacate the spectrum for an incumbent. Priority users have protection from the lower tier. The PA users are guaranteed access to some amount of spectrum via a Priority Access License (PAL) in the form of a channel. The exact channel will vary based on the presence of the tier 1 user. In the US, PAL will be assigned in up to 70 MHz (within 3550-3650 MHz). A single PAL user may not hold more than 40 MHz at any given time. The third tier is the Generalized Authorized Access (GAA), where sharing is left open to implementation. In the US, the GAA can use all the unused spectrum from 3550-3700 MHz. GAA users do not get explicit interference protection from other GAA users. The PAL assigns spectrum to a particular user statically. If the assigned spectrum is unutilized, it can only be used by the GAA tier and has no protections. The other PA users cannot use the unutilized PA spectrum, with protection from GAA, even though they may be willing to acquire the PAL dynamically for the duration of their extra capacity needs.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects.

Other aspects and many of the intended advantages of aspects will be readily appreciated as they become better understood by reference to the following detailed description. Like reference numerals designate corresponding similar parts.

DETAILED DESCRIPTION

Figure 1:
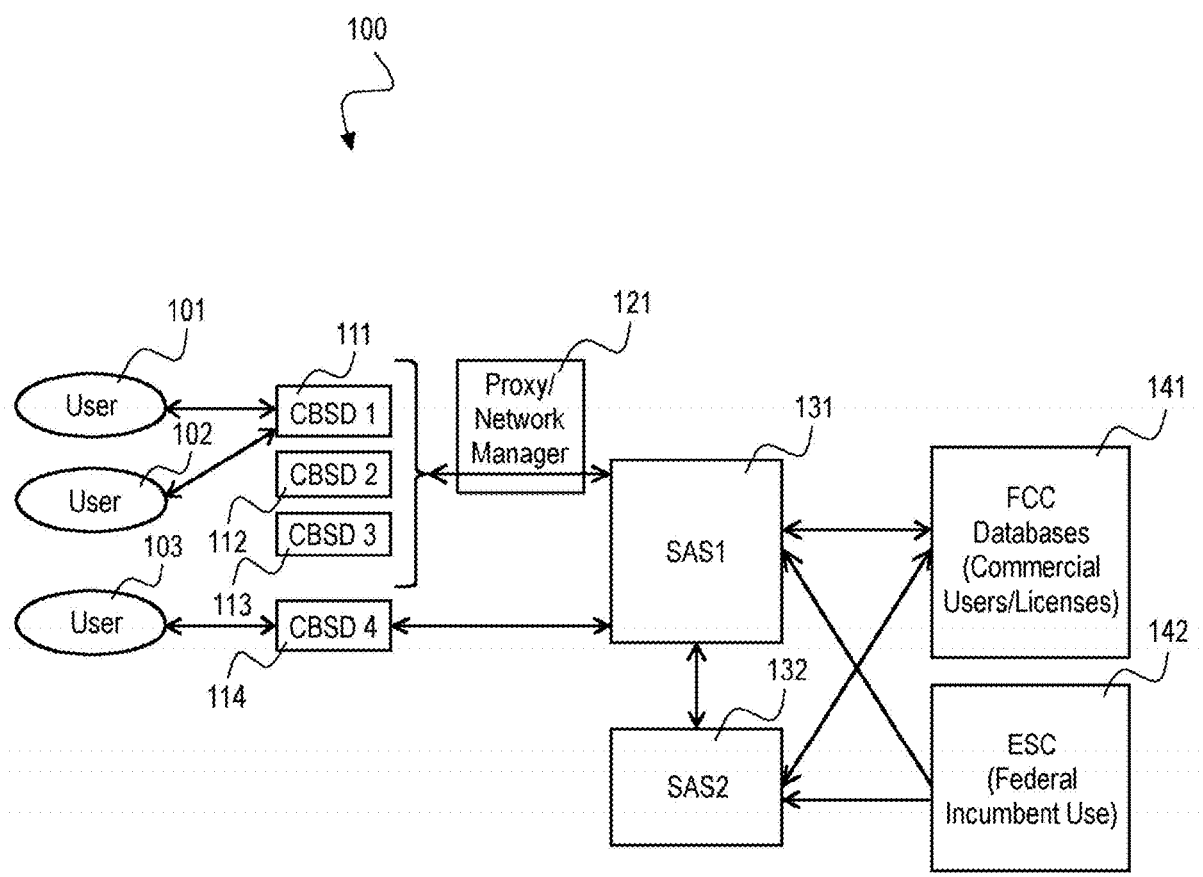
FIG. 1 is a block diagram of a Spectrum Access System (SAS) 100 for spectrum management according to the FCC regulation.

In the context of this disclosure, spectrum sharing system and spectrum sharing networks are described for sharing spectrum resources between different radio networks according to a spectrum sharing scheme.

Any of the radio networks and radio links may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc.

The scheme can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Note furthermore that a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

The scheme can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense. The following terms, abbreviations and notations will be used herein.

3GPP: 3rd Generation Partnership Project,
LTE: Long Term Evolution,
LTE-A: LTE Advanced, Release 10 and higher versions of 3GPP LTE,
BS: Base station, eNodeB,
FCC: Federal Communications Commission,
SAS: Spectrum Access System,
LSA: Licensed Shared Access
PA: Priority Access,
GAA: General Authorized Access,
PAL: Priority Access Licenses,
ASA: Authorized Shared Access,
CSS: Cloud Spectrum Services,
RF: Radio Frequency,
UE: User Equipment, MIMO: Multiple Input Multiple Output,
TDD: Time Division Duplex,
FDD: Frequency Division Duplex,
CBSD: Citizen Broadband Radio Service Device,
DP: Dedicated Pool,
SP: Shared Pool,
TP: Tertiary Pool.

It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The methods and devices described hereinafter may be applied in SAS systems, e.g. SAS systems 100 as shown in FIG. 1. The FCC (Federal Communications Commission) released a Report and Order outlining the rules for operating wireless devices in the 3.5 GHz band that spans from 3550-3700 MHz. FCC released this spectrum for sharing with the incumbents, which means that the incumbents get priority in that band and it can be used by broadband devices when (and where) incumbents are not using the spectrum. The incumbents in this band include DoD radars. There are two additional tiers of spectrum users in addition to the incumbents namely the Priority Access (PA) and General Authorized Access (GAA). The Priority Access Licenses (PAL) users get protection from GAA users which is similar to unlicensed spectrum.

Figure 9:
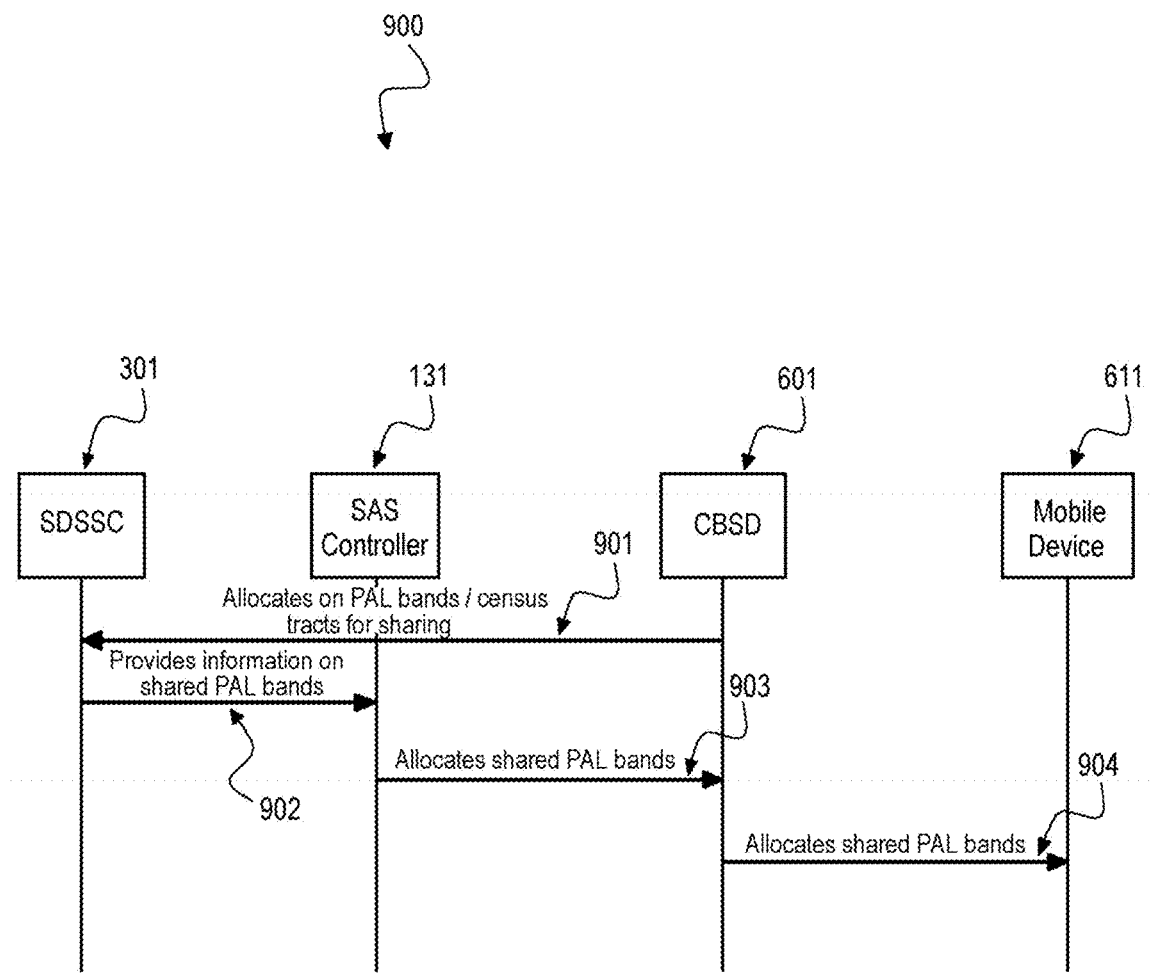
FIG. 9 is a schematic diagram illustrating an exemplary message flow 900 at the interface between SDSSC and SAS.

The FCC also mandates a Spectrum Access System (SAS) that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s) as shown in FIG. 9. If there are multiple SASs, they are supposed to be synchronized with each other. However, the FCC does not specify details of how the SAS have to be implemented and what information has to be synchronized.

Figure 2A:
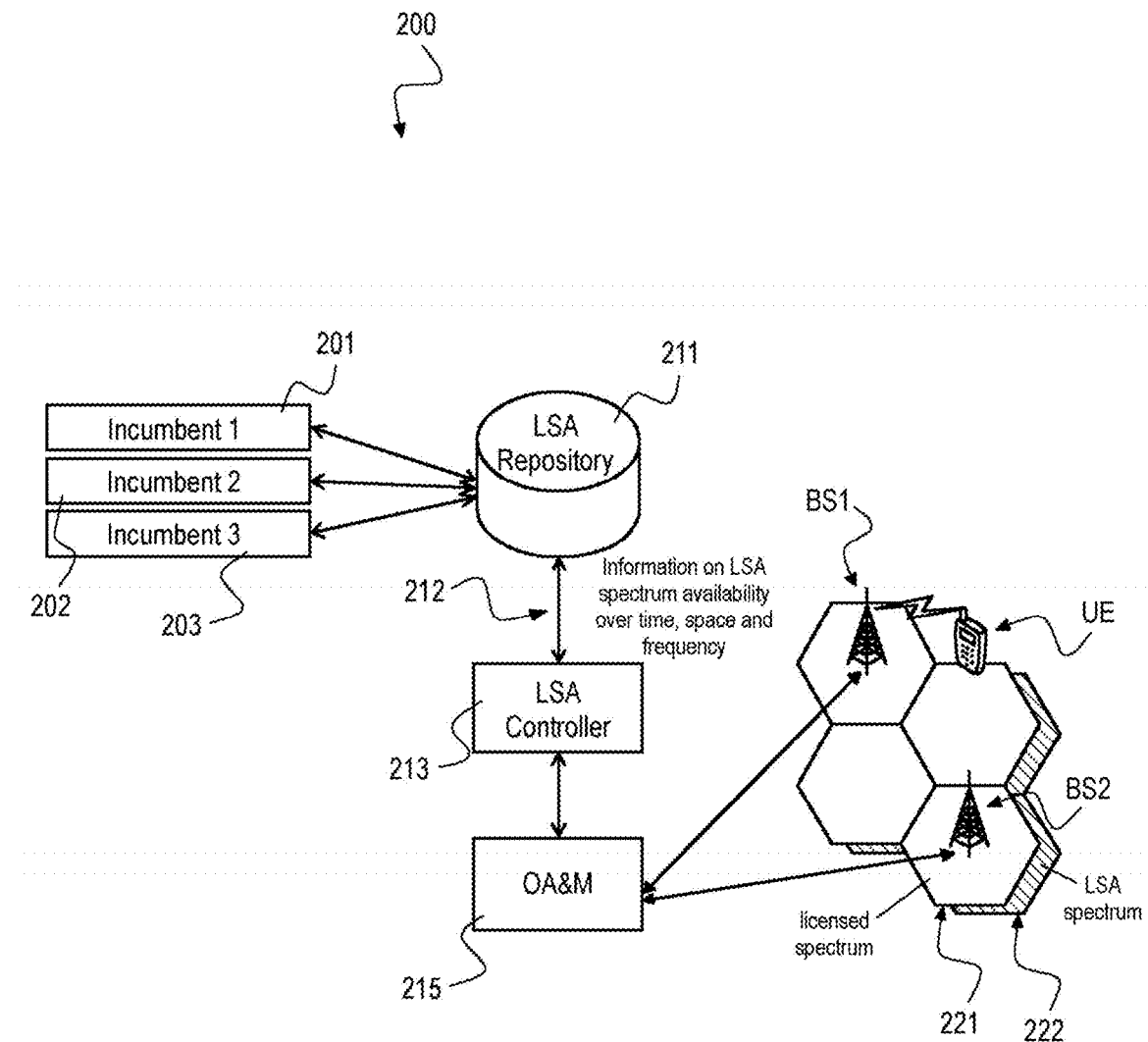
FIG. 2a is a block diagram of a Licensed Shared Access (LSA) system 200 as currently defined in Europe.

The methods and devices described hereinafter may be applied in LSA (Licensed Shared Access) systems, e.g. LSA systems 200 as shown in FIG. 2*a*, ASA (Authorized Shared Access) systems and CSS (Cloud Spectrum Services) systems. The LSA (Licensed Shared Access) concept was recently developed by RSPG (Radio Spectrum Policy Group) on a European level. The objective is to propose a new way for answering to the operators' needs for more spectrum. It is expected that no more dedicated spectrum will be available for cellular operators for mobile communications in the future. LSA thus proposes mechanisms for introducing shared spectrum based solutions, i.e. mobile cellular operators will have access to additional licensed spectrum from other licensees (like public safety, government. etc.) which they normally would not get access to. LSA is based on a similar solution as ASA (Authorized Shared Access). ASA, however, is limited to IMT spectrum while LSA is also addressing non-IMT bands. Both exist on a rather conceptual level for the time being.

A related technology is CSS (Cloud Spectrum Services) which addresses the same framework as LSA and ASA, but introduces more detailed implementation solutions. On a regulatory level, there is massive interest for LSA/ASA/CSS, in particular in Europe. CEPT WG FM has agreed to launch a corresponding project team. ETSI RRS has finalized the set-up of a so-called SRDoc (System Reference Document) which targets in particular the 2.3-2.4 GHz Band which is expected to be one of the most straightforward candidates for shared spectrum usage. This is also acknowledged by CEPT WG FM. CEPT has taken the inputs into account in its CEPT WG FM project teams PT52 and PT53. While current activities focus on the 2.3-2.4 GHz band in Europe, it should be noted that the usage of the LSA concept is not limited to any specific frequency band. In fact, it is expected that the 2.3-2.4 GHz represents a first exercise and in the future LSA usage will be extended to other bands.

The methods and devices described hereinafter may be applied in WiFi and Bluetooth systems or any near field communication (NFC) technology. WiFi is a local area wireless computer networking technology that allows electronic devices to connect to the network, mainly using the 2.4 gigahertz (12 cm) UHF and 5 gigahertz (6 cm) SHF ISM radio bands. The Wi-Fi Alliance defines Wi-Fi as any "wireless local area network" (WLAN) product based on the IEEE 802.11 standards. However, the term "Wi-Fi" is used in general English as a synonym for WLAN since most modern WLANs are based on these standards. Many devices can use WiFi, e.g. personal computers, video-game consoles, smartphones, digital cameras, tablet computers and digital audio players. These can connect to a network resource such as the Internet via a wireless network access point. Such an access point (or hotspot) has a range of about 20 meters indoors and a greater range outdoors.

Bluetooth is a wireless technology standard for exchanging data over short distances (using short-wavelength UHF radio waves in the ISM band from 2.4 to 2.485 GHz) from fixed and mobile devices, and building personal area networks (PANS). It can connect several devices, overcoming problems of synchronization.

The methods and devices described hereinafter may be applied in LTE FDD mode as well as in LTE TDD mode systems, e.g. LTE mode systems having a type 1 LTE frame structure or LTE mode systems having a type 2 LTE frame structure. The type 1 LTE frame includes 10 sub-frames 204 each having two slots 206. A basic type 1 LTE frame has an overall length of 10 milliseconds. The type 2 LTE frame has an overall length of 10 milliseconds. The 10 ms frame comprises two half frames, each 5 ms long.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The FCC released a Report and Order on Apr. 17, 2015 "FCC REPORT AND ORDER AND SECOND FURTHER NOTICE OF PROPOSED RULEMAKING, FCC 15-47, Apr. 21, 2015" outlining the rules for operating wireless devices in the 3.5 GHz band that spans from 3550-3700 MHz. FCC released this spectrum for sharing with the incumbents, which means that the incumbents get priority in that band and it can be used by broadband devices when (and where) incumbents are not using the spectrum. The incumbents in this band include DoD radars. There are two additional tiers of spectrum users in addition to the incumbents namely the Priority Access (PA) and General Authorized Access (GAA). The Priority Access Licenses (PAL) users get protection from GAA users which is similar to unlicensed spectrum.

The FCC also mandates a Spectrum Access System (SAS) that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s) as shown in FIG. 1. If there are multiple SASs, they are supposed to be synchronized with each other. However, the FCC does not specify details of how the SAS have to be implemented and what information has to be synchronized.

In the following, access points (APs) and user equipments (UEs) are described. The term AP can be broadly interpreted. In some cases, it may be rather an eNB, Small Cell, Femto/Pico/Micro/Macro Cell, etc. Also, in the context of SAS, the term CBSD is used instead of AP. Note that the term "AP" encapsulates all these technologies/terms. A UE may act as a AP/CBSD, in this case the linkage to the SAS controller is maintained through a different (i.e. non-SAS) connection, e.g. through a dedicated licensed LTE band. In this case, it is the UE classical modem that interacts with a novel SAS stack in order to make the classical (i.e., non-SAS) UE compliant to SAS requirements.

Negotiation between AP/CBSD may be performed in order to query a UE or multiple/all UEs whether they are SAS compatible. Only if they are, the SAS stack is added and SAS bands are supported. Otherwise, SAS is not offered as a service to UEs. I.e., a UE may receive query from AP/CBSD on SAS compatibility and/or intention to use SAS bands, then answer to query by either acknowledging or declining intended usage of SAS bands/services.

FIG. 1 is a block diagram of a Spectrum Access System (SAS) 100 for spectrum management according to the FCC regulation. The SAS system includes an exemplary number of two central SAS coordinators 131, 132 for coordinating spectrum use between incumbents, PA (priority access) users and GAA (general authorized access) users according to FCC (Federal Communications Commission) standardization.

The SAS communication system 100 includes an exemplary number of two SAS entities (also referred to as SAS coordinator or SAS controller) 131, 132, FCC databases 141 and an ESC (Environmental Sensing Capability) entity 142 which are coupled between each other. An exemplary number of four CBSD (Citizen Broadband Radio Service Devices) entities 111, 112, 113, 114 are coupled with the SAS1 entity 131, where CBSD1, CBSD2 and CBSD3 are coupled via a proxy network manager 121. The CBSD devices may be coupled to users 101, 102, 103, 104. In the example of FIG. 1 the CBSD1 device is connected to a first user 101 and a second user 102 while CBSD4 device is connected to a third user 103.

The SAS entities 131, 132 have the following functionality: Enact and enforce all policies and procedures developed by the SAS Administrator; Determine and provide to CBSDs the permissible channels or frequencies at their location; Determine and provide to CBSDs the maximum permissible transmission power level at their location; Retain information on, and enforce, Exclusion Zones and Protection Zones; Communicate with the ESC to obtain information about federal Incumbent User transmissions and instruct CBSDs to move to another frequency range or cease transmissions; Ensure that CBSDs operate in geographic areas and within the maximum power levels required to protect federal Incumbent Users from harmful interference; Register and authenticate the identification information and location of the CBSDs; Ensure that CBSDs protect non-federal incumbent users from harmful interference; Protect Priority Accessed Licensees from interference caused by other PALs and from GAA users; Facilitate Coordination between GAA users operating Category B CBSDs; Resolve conflicting uses of the band while maintaining a stable radio frequency environment; Ensure secure and reliable transmission of information between the SASs and the GBSDs.

In the US for tier 2, PAL may be assigned in up to 70 MHz (within 3550-3650 MHz). A single PAL user may not hold more than 40 MHz at any given time in chunks of 10 MHz each: At any given point of time, there can be a maximum of 7 PA users with 10 MHz each. It is possible that less than 7 PALs acquire all the 70 MHz of spectrum. E.g. the spectrum ownership and utilization could be as shown in the Example of Table 1:

TABLE 1

Example for a spectrum ownership and utilization of PAL spectrum

| Tier-2 user | Spectrum Owned | Spectrum Utilized | Spectrum forced into GAA tier |
|---|---|---|---|
| PAL 1 | 40 MHz | 20 MHz | 20 MHz |
| PAL 2 | 30 MHz | 20 MHz | 10 MHz |

The 30 MHz of spectrum reduced to GAA tier could have been monetized. The traditional SAS system is not capable of creating opportunity for an additional PAL in the above use-case. There was no accommodation if PAL 2 needed more than 30 MHz of spectrum on-demand.

With respect to spectrum usage in SAS the following definitions can be applied: S=Total spectrum available in tier 2 is 70 MHz within 3550-3650 MHz. A Primary Access (PA) user may own spectrum in the range of 10-40 MHz in multiples of 10 MHz. There may be unassigned channels from the 70 MHz of tier 2 spectrum.

Beyond SAS, the further definitions can be applied: All the assigned channels to PALs are combined referred to as Dedicated Pool (DP). The unassigned channels from tier 2 may be called a Shared Pool (SP). The PA user is assigned two kinds of spectrum: a Primary Spectrum (PS) of 10 MHz;

and a Secondary Spectrum (SS) which is an additional spectrum for dedicated use by the PA user from within the Shared Pool in multiples of 10 MHz. In addition to this, the PA user can use the GAA tier as Tertiary Spectrum (TS).

With the above, the following relations hold true:
Total Spectrum in tier 2 (S)=70 MHz;
Dedicated Pool (DP)=$\Sigma_{i=1}^{N} PS_i$;
Shared Pool (SP)=S−DP;
Tertiary Pool (TP)=Total spectrum in tier 3=80 MHz, where N=total number of PA users in the system.

By applying spectrum sharing techniques as described in this disclosure the available spectrum can be efficiently shared. For example an additional PAL may be created in the above use-case. The basic principles of spectrum sharing techniques according to the disclosure are the following:

1. Allow for elastic ownership of tier 2 PA spectrum that is assured of protection from tier 3 GAA users. It increases the number of PA users.
2. Create a pay-per-use spectrum ownership. This decreases the cost of ownership of spectrum for the PA users.
3. More PA users willing to acquire tier 2 licenses increases the revenue potential for the system.
4. Create a preference for a PA use over a GAA use.
5. A centralized control mechanism with real-time monitoring of tier-2 spectrum.
6. Allow for choice between dedicated licensed/unlicensed spectrum usage for PAL.

FIG. 2a is a block diagram of a Licensed Shared Access (LSA) system 200 as currently defined in Europe including an LSA controller 213 for adapting spectrum usage. The license shared access (LSA) communication system 200 includes a LSA repository 211, an LSA controller 213, an OA&M entity, an exemplary number of three incumbents 201, 202, 203 and a public mobile communication system having an exemplary number of two base stations BS1, BS2 and one exemplary user equipment UE connected to base station BS1. The public mobile communication system provides a licensed spectrum 221 and an LSA spectrum 222.

The LSA repository 211 may store information on LSA spectrum availability over time, space and frequency. The LSA controller 213 may be used for controlling access to the LSA system. The OA&M entity 215 may be used for maintaining operation of the LSA system.

While this disclosure mainly addresses the SAS case (US scenario) as shown in FIG. 1, the basic principles are also applicable to the European LSA context as shown in FIG. 2a.

Figure 2B:
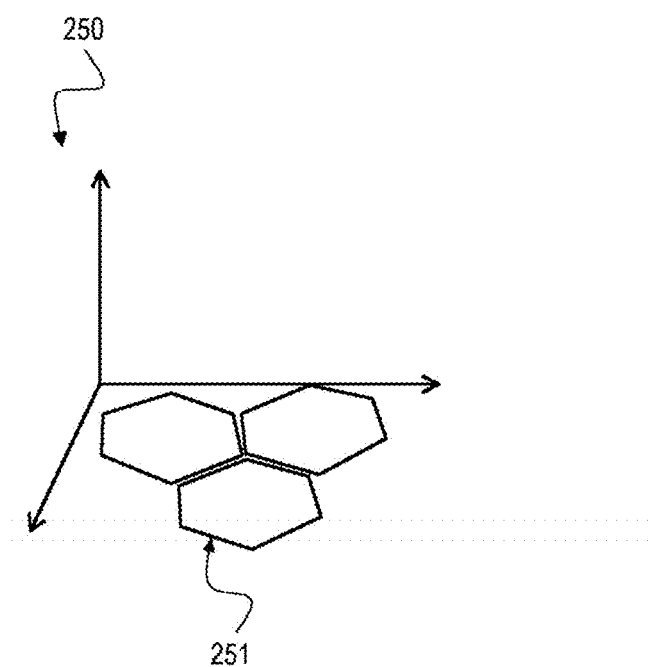
FIG. 2b shows a diagram illustrating two-dimensional spectrum sharing approach.
Figure 2C:
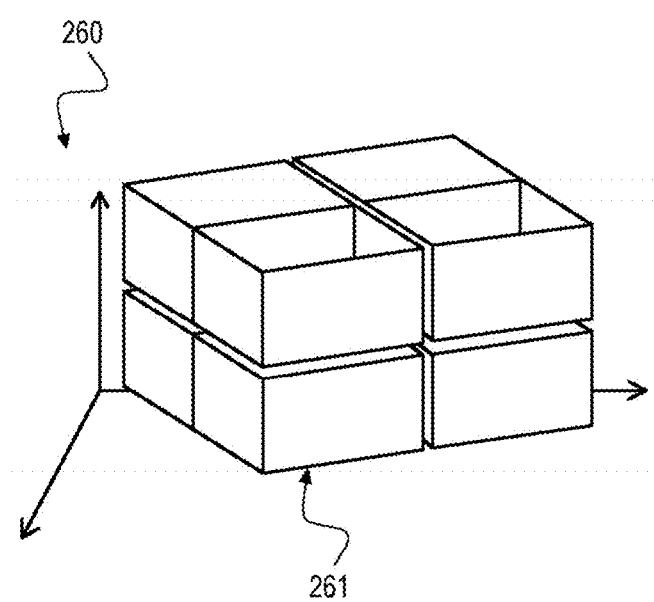
FIG. 2c shows a diagram 260 illustrating three-dimensional spectrum sharing approach.

FIG. 2b shows a diagram 250 illustrating two-dimensional spectrum sharing approach of systems such as LSA, CBRS, SAS, etc. For CBRS/SAS, spectrum is allocated for so-called "Census Tracts" 251, typically on a 2-D basis. The LSA and CBRS/SAS systems are typically considering spectrum allocation from a 2-D perspective, i.e. over 2-dimensional space. However, according to the disclosure, this concept can be extended to 3-dimensional sharing as illustrated in FIG. 2c. So, the disclosed re-allocation strategies as described below can be employed on the 2-D basis (e.g., for terrestrial radio services), but also on a 3-D basis (e.g., for Drone communication or similar).

It is thus possible that 3-D boxes 261 (or any other 3-D shape) are defined which may be auctioned independently. A Satellite/Drone/etc. may thus operate within a given spatial "block" with guaranteed interference limits being implemented. In the upper right hand side, each of the boxes may be assigned to one (or multiple) Drones/Satellites/other devices such that they can move in the assigned space while maximum interference levels are being guaranteed. Also, in such a 3-D case, stations on the ground may prefer to go towards 3-D auctioning in order to be certain that no interference is coming from above (or from below).

Furthermore, this allocated 3-D shaped space may move over time. A satellite for example moves and the corresponding allocation space may be defined in such a way that it follows the movement of the satellite (e.g., the satellite may always be in the middle of the 3-D shaped space within which the maximum interference levels are being defined, typically following an auctioning process or similar). Similar, in case of a Drone or a Drone Swarm (each 3-D shaped space covering a single, multiple or all Drones) the 3-D shaped box (and thus the space for which a maximum interference level is being defined) may move with the movement of the Drone(s) (swarm).

For CBRS/SAS, this approach is valid for PAL (Priority Access License) and GAA (General Authorized Access) Users. Typically, if previously a 2-D license (typically on the ground) was acquired and the system moves to 3-D license granting (as illustrated above), the ground-systems will typically get a 3-D shaped space over which the interference level is guaranteed. In this way, the ground system will be protected from stations above (or possibly below) that may create additional interference.

Figure 3:
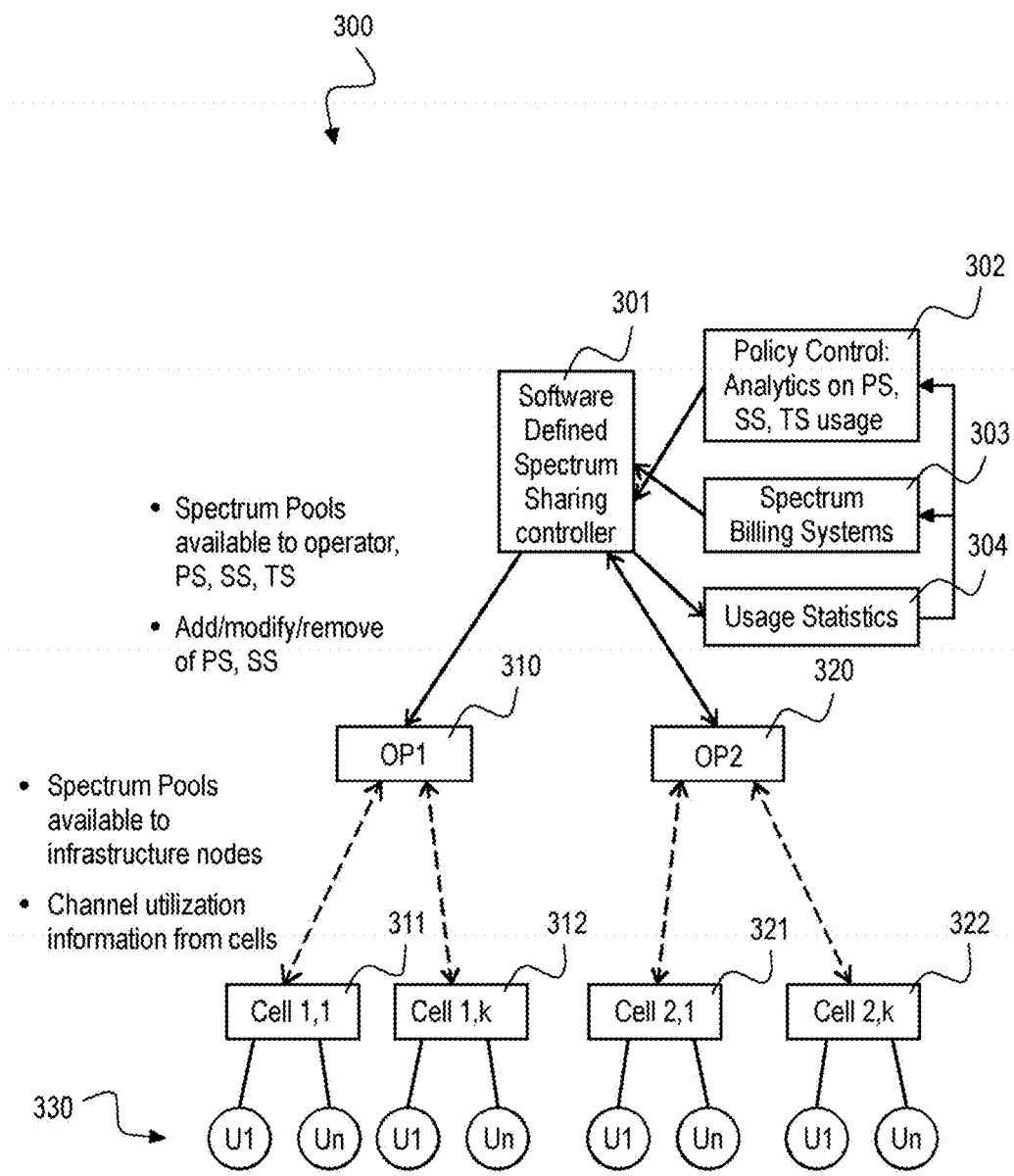
FIG. 3 is schematic diagram illustrating the architecture of an exemplary spectrum sharing system 300 with a Software Defined Spectrum Sharing Controller (SDSSC) according to the disclosure.

FIG. 3 is schematic diagram illustrating the architecture of a spectrum sharing system 300 with a Software Defined Spectrum Sharing Controller (SDSSC) 301 according to the disclosure. The spectrum sharing system 300 as described in this disclosure is based on a centralized controller that arbitrates spectrum access among multiple operators. This controller is referred to as Software Defined Spectrum Sharing Controller (SDSSC) 301. All the operator networks are connected to the SDSSC 301.

The SDSSC 301 is coupled to an exemplary number of two operator networks of a first network operator OP1 310 and a second network operator OP2 320. The first network of OP1 310 includes an exemplary number of k radio cells 311, 312 each one coupled to respective nodes U1 to Un, 330. The second network of OP2 320 includes an exemplary number of k radio cells 321, 322 each one coupled to respective nodes U1 to Un, 330. Of course, there may be more than two radio networks and the radio networks may have different numbers of radio cells and network nodes.

Spectrum pools are available for infrastructure nodes 330 and channel utilization information can be provided by the cells 311, 312, 321, 322. Spectrum pools are also available to operators 310, 320, e.g. from primary spectrum (PS), secondary spectrum (SS) and tertiary spectrum (TS) as described above or below with respect to FIG. 4. The SDSSC can add, modify and/or remove PS and SS pools.

The SDSSC 301 is coupled with a policy control module 302 which may perform policy control, e.g. based on analytics of PS, SS and TS usage. The SDSSC 301 is further coupled with a spectrum billing system 303 for billing the user for the used spectrum. The SDSSC 301 is further coupled with a usage statistics module 304 for computing statistics of spectrum usage by the users.

In the SAS system as described above with respect to FIG. 1 the SAS controller is responsible for protection and coordination of spectrum among incumbents, primary access and general access as defined in the 3 tier structure. The SAS enacts and enforces all the FCC mandated policies with regards to spectrum access.

The SDSSC controller 301 enhances the functionality of tier 2 spectrum (PAL) by providing enablers for sharing the spectrum amongst PAL users. It shall have federal compliance and interfaces to the SAS controller, interfaces to the spectrum databases, the operators and CBSDs. This objective may be achieved through the following exemplary process: 1) A first PAL user provides information to the SDSSC Spectrum Sharing controller 301 indicating that it is proposing (terminating the proposal) to share its PAL spectrum with other users. A typical message to the SDSSC Spectrum Sharing node 301 can be as follows: {User ID, PAL Census Tract ID, (proposal to share PAL spectrum, termination of shared PAL spectrum)}. 2) A second user is intending to use the available PAL spectrum on a shared basis. This user is either automatically informed by the SDSSC Spectrum Sharing on the availability of PAL on a shared basis (this user may be registering to the SDSSC Spectrum Sharing controller 301 through a message such as {User ID, Target Census Tract ID, (request to obtain information on available shared PAL spectrum, termination of request)}) or may request information on the availability of such spectrum ({User ID, Target Census Tract ID, (request to access to shared PAL spectrum, termination of request)}). The SDSSC Spectrum Sharing controller 301 may provide the information on the available spectrum (e.g. through a message such as {User ID, Target Census Tract ID, PAL spectrum share ID, "PAL spectrum (no longer) available for sharing", sharing duration, sharing conditions}). The concerned user may then confirm the proposal through a message such as ({User ID, Target Census Tract ID, PAL spectrum share ID, "Accept PAL spectrum on secondary basis"}). The SDSSC Spectrum Sharing controller 301 may finally confirm (or reject) the transaction (e.g. through a message such as {User ID, Target Census Tract ID, PAL spectrum share ID, "shared access confirmed/rejected"}).

The following services may be provided by the SDSSC 301: 1) Implementing secondary market for Primary Access Licensees within SAS framework. 2) Determine and provide to SAS the list of permissible channels or frequencies at their location. 3) Determine and provide to SAS the maximum permissible transmission power levels at their location. 4) Retain information about the Secondary Pool available for CBSD. 5) Facilitate CBSD to secure a secondary PAL use spectrum from the Secondary Pool. 6) Ensure and create framework for the CBSDs to protect non-federal incumbent users consistent with the rules. 7) Ensure and create coordination framework amongst users of PAL spectrum.

In the following exemplary service interfaces of the SDSSC 301 are described. A first service interface is the SDSSC-SAS interface. This interface may be used by SDSSC 301 to inform SAS about authorized secondary users of the PAL license bands for use during registration of CBSD. It may be used as follows: A) Proposal for available PAL spectrum for shared usage: {User ID, PAL Census Tract ID, (proposal to share PAL spectrum, termination of shared PAL spectrum)}. B) Request for information on available PAL spectrum: {User ID, Target Census Tract ID, (request to obtain information on available shared PAL spectrum, termination of request)}) or {User ID, Target Census Tract ID, (request to access to shared PAL spectrum, termination of request)}. C) Information provided: {User ID, Target Census Tract ID, PAL spectrum share ID, "PAL spectrum (no longer) available for sharing", sharing duration, sharing conditions}). D) Confirmation of the proposal by User: {User ID, Target Census Tract ID, PAL spectrum share ID, "Accept PAL spectrum on secondary basis"}. E) The SDSSC Spectrum Sharing controller 301 finally confirms (or rejects) the transaction: {User ID, Target Census Tract ID, PAL spectrum share ID, "shared access confirmed/rejected"}.

A second service interface is the SDSSC-Spectrum Pool interface. This interface may update the database of secondary pool with under-utilized PAL licensed bands. The database may be fed either by a PAL licensee or by the SAS controller or by the SDSSC Spectrum Sharing controller 301: {User ID, Target Census Tract ID, PAL Usage Level}. The SDSSC Spectrum Sharing controller may identify corresponding underused PAL areas and spectrum blocks and make them available for shared usage.

A third interface is the SDSSC-Operator interface. This interface may perform in SDSSC→Operator direction authorization for use of shared pool of spectrum and may provide in Operator→SDSSC direction information about detected bands.

A fourth interface is the SDSSC-CBSD interface. This interface may inform secondary operator CBSD about the authorizations from PAL licensees. This information shall be used during SAS registration.

A fifth interface is the SDSSC-Billing interface. This interface may collect the statistics on usage spectrum resource per-cell for every PAL licensed band. This may be normalized to channel busy-time percentage, e.g. according to {cell_id, Operator_identifier, busy-time_percentage}.

A sixth interface is the SDSSC-Usage Statistics interface. This interface may provide information to the analytics module and billing interface. For example the following information may be provided: Channel usage: {cell_id, Operator_identifier, busy-time_percentage}; UE load factor: {cell_id, Count of UEs}; Packet Error Rate, Loading factor of each Modulation Schemes, Retransmissions.

A seventh interface is the SDSSC-Analytics interface. This interface may provide in SDSSC→Operator direction recommendations on spectrum usage by primary and secondary operators.

The following identifiers may be used: PAL_identifier, i.e. a unique identifier for each PAL licensee. Operator_identifier, i.e. a unique identifier for each licensee, either a PAL licensee or the secondary Licensee of PAL. Cell_id that identifies a cell (geolocation and coverage). Busy-time_percentage: normalized fraction of time the channel is busy versus total time.

The connectivity between various nodes in the network is shown in FIG. 3.

Figure 4:
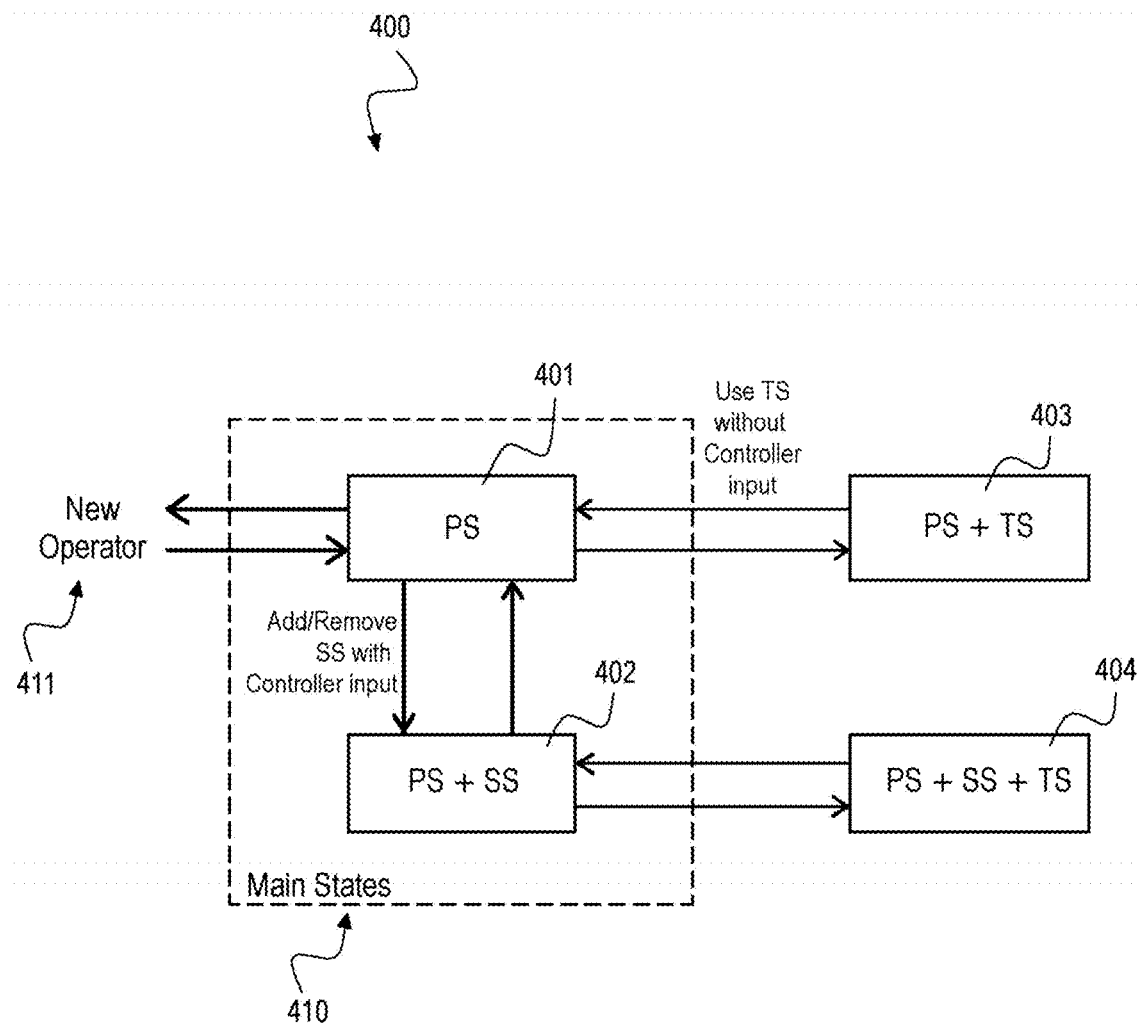
FIG. 4 is a schematic diagram illustrating an example of state transition 400 between spectrum usage states of a spectrum sharing system according to the disclosure.

FIG. 4 is a schematic diagram illustrating state transition 400 between spectrum usage states of a spectrum sharing system according to the disclosure. The state transition 400 may be applied for a spectrum sharing system 300 as described above with respect to FIG. 3.

There are three spectrum types. A first type is the Primary Spectrum (PS). This is the minimal amount of spectrum always guaranteed to be available to an operator. The operator may pay an upfront licensing fee only for the PS. The total Dedicated Pool is a sum of all the Primary Spectrum allocated to all the operators in the system, that may be represented by the following relation: $DP=\Sigma_{i=1}^{N} PS_i$. A second spectrum type is the Secondary Spectrum (SS). This is assigned by the SDSSC to an operator on an interference free basis. The amount of SS channels may be different for each operator and need not be contiguous. The availability of this spectrum to an operator is not guaranteed and is made available from the freely available tier 2 Shared pool (SP) based on analytics and Machine Learning to assess the demand. A third spectrum type is the Tertiary Spectrum (TS). This is the same as the tier 3 GAA spectrum in the SAS parlance. This is the freely available pool of spectrum accessed by the operator on demand for elasticity in their capacity needs.

The spectrum being used by any operator, e.g. new operator 411 shown in FIG. 4, may be a combination of the following dedicated and shared spectrum pools. 1) PS, 401. 2) PS+SS, 402. 3) PS+TS, 403. 4) PS+SS+TS, 404. The state diagram 400 shows the transition between the states of spectrum being used. The main states 410 are the states PS, 401 and PS+SS, 402. Adding or removing SS to/from PP can be performed with controller input while adding or removing TS to/from PP can be performed without controller input.

From the state transition diagram 400 of spectrum usage by an operator, the following state transitions result in an update to the SAS secondary pool database: PS, 401→PS+ SS, 402 and PS+SS, 402→PS, 401.

Figure 5:
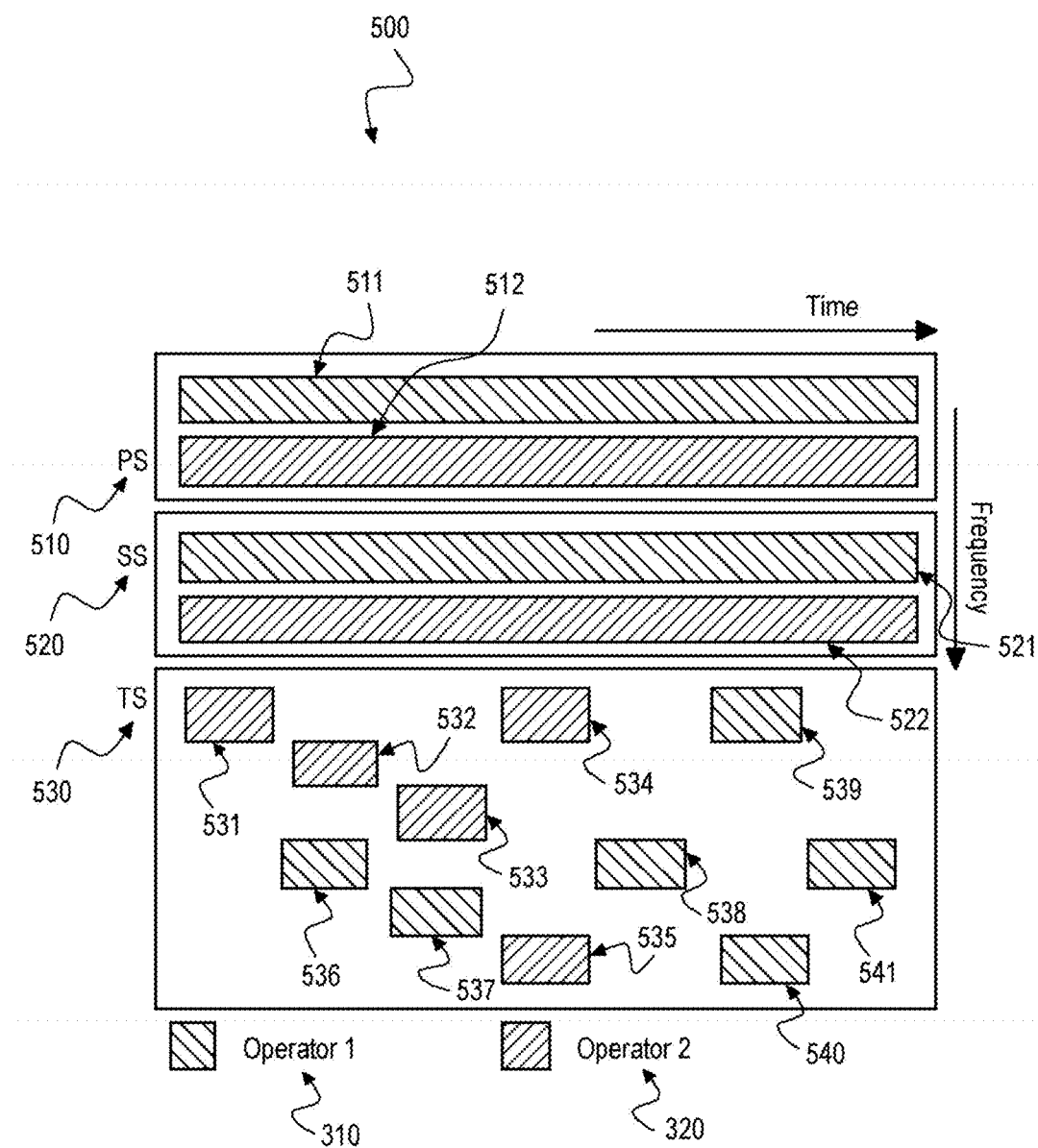
FIG. 5 is a schematic diagram illustrating exemplary channel resources 500 of a spectrum sharing system according to the disclosure.

FIG. 5 is a schematic diagram illustrating channel resources 500 of a spectrum sharing system according to the disclosure. The three different spectrum types PS, 510, SS, 520 and TS 530 as described above with respect to FIG. 4 are shown for operator 1, 310 and operator 2, 320 as described in the system 300 of FIG. 3. Channel resources 500 are depicted with respect to time (horizontal axis) and frequency (vertical axis). A geographic allocation is also possible but not shown in FIG. 5.

For the first type PS, 510 and the second type SS, 520 channel resources are allocated for both operators 310, 320, that is, resources 511 of the first type 510 for operator 1, 310, resources 512 of the first type 510 for operator 2, 320, resources 521 of the second type 520 for operator 1, 310 and resources 522 of the second type 520 for operator 2, 320. For the third type TS, 530 channel resources 531, 532, 533, 534, 535 are allocated for operator 2, 320 and channel resources 536, 537, 538, 539, 540, 541 are allocated for operator 1, 310. These channel resources for the third type TS, 530 are blocks of specific time and frequency range.

Figure 6:
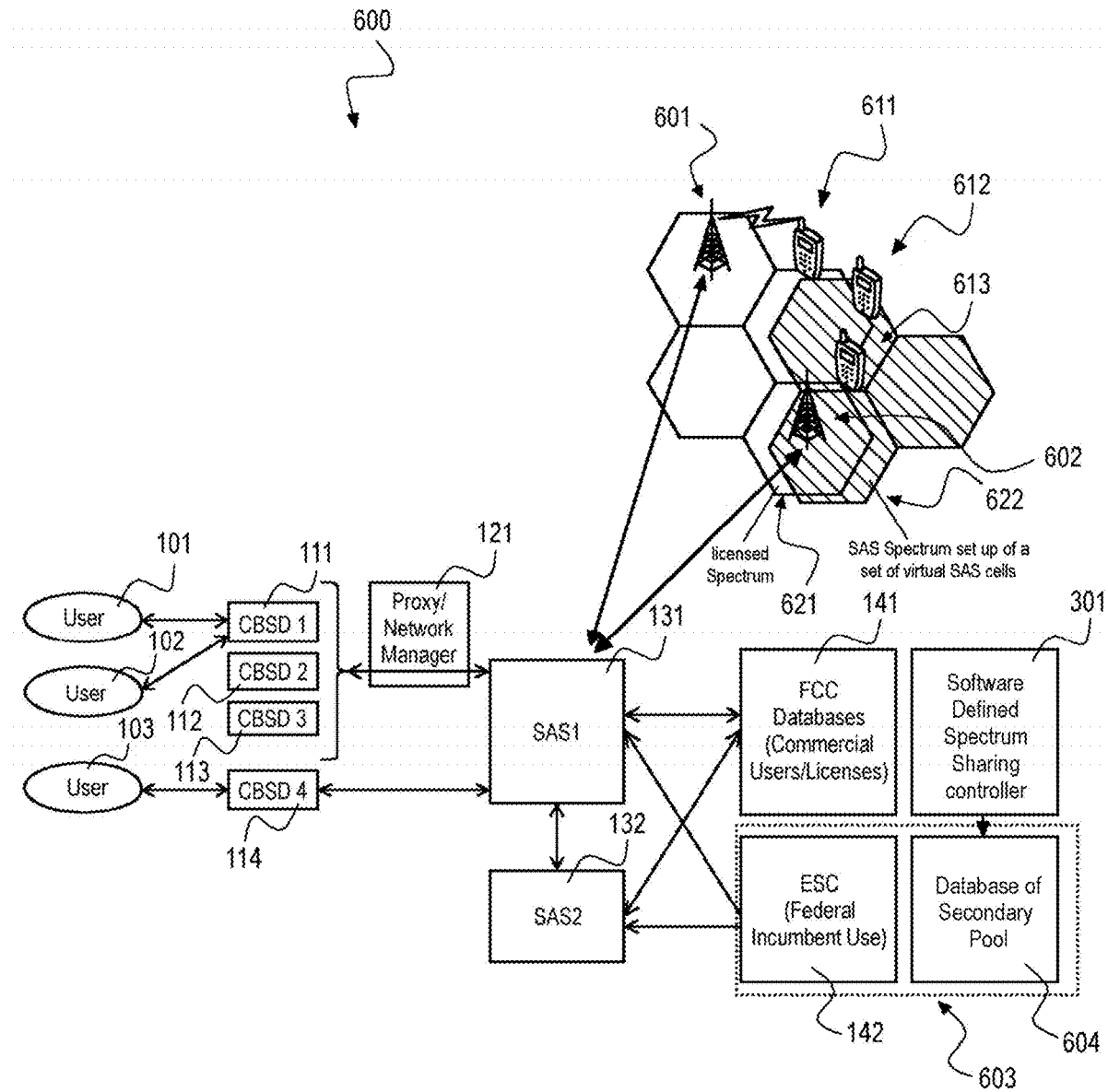
FIG. 6 is a block diagram of an exemplary SAS system 600 including a Software Defined Spectrum Sharing Controller (SDSSC) for controlling spectrum sharing according to the disclosure.

FIG. 6 is a block diagram of an SAS system 600 including a Software Defined Spectrum Sharing Controller (SDSSC) for controlling spectrum sharing according to the disclosure. The SDSSC 301 may correspond to the SDSSC 301 described above with respect to FIG. 3. The SDSSC 301 may be collocated to the SAS system 100 as described above with respect to FIG. 1. The SDSSC 301 may be placed with the FCC databases 141 or the ESC database 142 (see FIG. 1). Alternatively, the SDSSC 301 may be added to or integrated with the SAS controller, e.g. SAS 1, 131 or SAS 2, 132. A database of secondary pool 604 may be collocated with the ESC database 142. The SDSSC 301 may access to this database of secondary pool 604.

The SAS system 600 may use the various interfaces as described above with respect to FIG. 3. The operator network with CBSD 1, 601, CBSD 2, 602 and End Users 611, 612, 613 may be integrated for example as operator 1, 310 network as described above with respect to FIG. 3, into the SAS system 600. The licensed spectrum 621 may overlap with the SAS spectrum 622.

The Software Defined Spectrum Sharing Controller (SDSSC) 301 may update the database of spectrum from the Shared Pool 604 used by the PA users in a dedicated manner to ensure protection from GAA users. The interface between SDSSC and the SAS system is shown in FIG. 6.

With respect to FIGS. 5 and 6, instead of a GAA WiFi AP, any other GAA entity can be used, including a GAA eNB, GAA CBSD (Citizen Broadband Service Device), GAA Small Cell, GAA Pico/Micro/Macro/etc. Cell, etc. Also, the same may be applied to the UE side, i.e. an existing modem (such as an LTE, MuLTEfire, WiFi, WiGig, etc. modem) can be complemented by an external SAS stack. This is in particular useful if the UE takes the role of a GAA CBSD/ AP for example. It is indeed possible that a LTE (or any other technology such as WiFi, 5G based on 3GPP Rel. 15 and beyond, etc.) link is used to connect the SAS stack to the SAS controller in order to maintain the expected information exchange with this entity (including triggers to vacate the band when the priority user (typically incumbent and/or PAL user) arrive and need to retake the band, or operational assignments concerning bands, power levels, etc. configurations typically with the objective to meet interference requirements). Note that the approach is not limited to GAA usage and can possibly also be applied to PAL or jointly to PAL and/or GAA usage. Also, the same approach can be used for the Licensed Shared Access (LSA) approach in order to make a classical (3GPP/WiFi/etc.) non-LSA eNB/ AP and/or classical non-LSA UE compatible with the LSA scheme, i.e. an LSA stack would be added that is communicating with the classical (non-LSA) stack. Note also that CBRS/SAS and LSA are just examples for spectrum sharing schemes. This technology is applicable to any scheme where one user (group) has a different priority compared to another user (group) or other users (groups). To give an example, this may apply to Television White Space type of applications or vehicular applications in the 60 GHz band where Intelligent Transport Systems (ITS) systems may share the same bands (or may at least overlap, as it is the case for the current European 63-64 GHz regulation for ITS which is overlapping with 2 WiGig band, in the future it is expected that this is modified such that the overlap is only affecting a single WiGig channel (and not two of them)) and a prioritization of one system over another (typically a prioritization of the ITS system over commercial WiGig application) may be required.

Note that the illustrated interactions of the classical stack (e.g., WiFi Stack) with the SAS stack on the Application Layer (e.g., "Driver-to-Driver" type of interaction) is only an example. This interaction can also be implemented e.g.

SAS Application Layer to/from classical system (e.g., WiFi) Application Layer, Supplicant (Security) Layer, Data Stack Layer, MLME Layer, MAC Layer and/or PHY Layer.

SAS Data Stack Layer to/from classical system (e.g., WiFi) Application Layer, Supplicant (Security) Layer, Data Stack Layer, MLME Layer, MAC Layer and/or PHY Layer.

It is also possible that the SAS LBT functionality interacts with the classical system (e.g., WiFi): In this case, SAS LBT connects to/from classical system (e.g., WiFi) Application Layer, Supplicant (Security) Layer, Data Stack Layer, MLME Layer, MAC Layer and/or PHY Layer.

It is possible that the SAS stack is complemented by further Layers (e.g., Security Layer, etc.). In this case, the upper interactions apply in the same way between any new Layer and the classical system (e.g. WiFi), i.e. to/from classical system (e.g., WiFi) Application Layer, Supplicant (Security) Layer, Data Stack Layer, MLME Layer, MAC Layer and/or PHY Layer.

Figure 7:
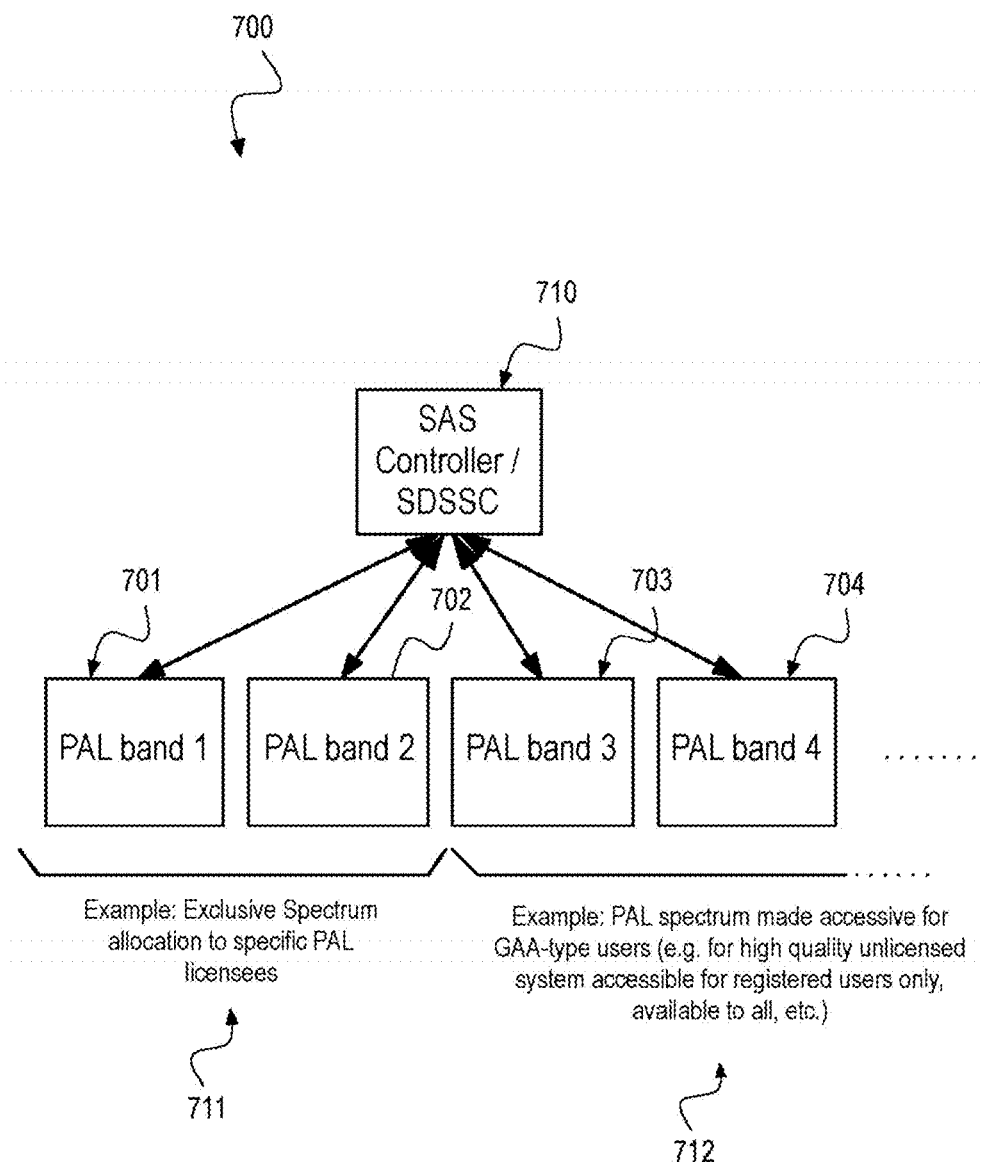
FIG. 7 is a schematic diagram illustrating an example of controlling PAL spectrum 700 by a Software Defined Spectrum Sharing Controller (SDSSC) according to the disclosure.

FIG. 7 is a schematic diagram illustrating controlling of PAL spectrum 700 by a Software Defined Spectrum Sharing Controller (SDSSC) according to the disclosure. The SAS Controller/SDSSC 710 controls spectrum access to an exemplary number of four PAL bands, a first PAL band 701, a second PAL band 702, a third PAL band 703 and a fourth PAL band 704. In one example implementation exclusive spectrum allocation 711 is for specific PAL licenses, e.g. using PAL bands 1 and 2, 701, 702. The other PAL spectrum of PAL bands 3 and 4, 703, 704 is made accessive for GAA-type of users, e.g., for high quality unlicensed system accessible for registered users only, available to all, etc.

FIG. 7 illustrates the concept to exploit PAL pooling for extending GAA usage as described in the following. Typically, the PAL spectrum and the GAA spectrum are reserved for different spectrum usage schemes-PAL spectrum allows a PAL licenses to access to exclusive spectrum availability in a specific census tract. GAA, on the other hand, is generally available and no exclusive usage is implemented; rather, GAA users need to compete for the spectrum based on protocols such as CSMA/CA.

According to the framework of this disclosure, PAL spectrum may be pooled by network operators ("investors") and they can choose to allow for unlicensed-type of access (exploiting the license-by-rule framework of the FCC) for their respective clients. In such a way, a Wi-Fi/MuLTEfire or similar operator can acquire new PAL spectrum and repurpose it to contention based access.

The overall coordination may be done by the SDSSC 301. The SDSSC 301 can decide whether 1) A specific PAL band is allocated to exclusive usage or 2) A specific PAL band is opened up for general access (similar to GAA). The general access may relate to any user requesting access to the band or to registered users only, possibly paying for some extended service which allows them to use the service. The overall principle is illustrated in FIG. 7.

Figure 8:
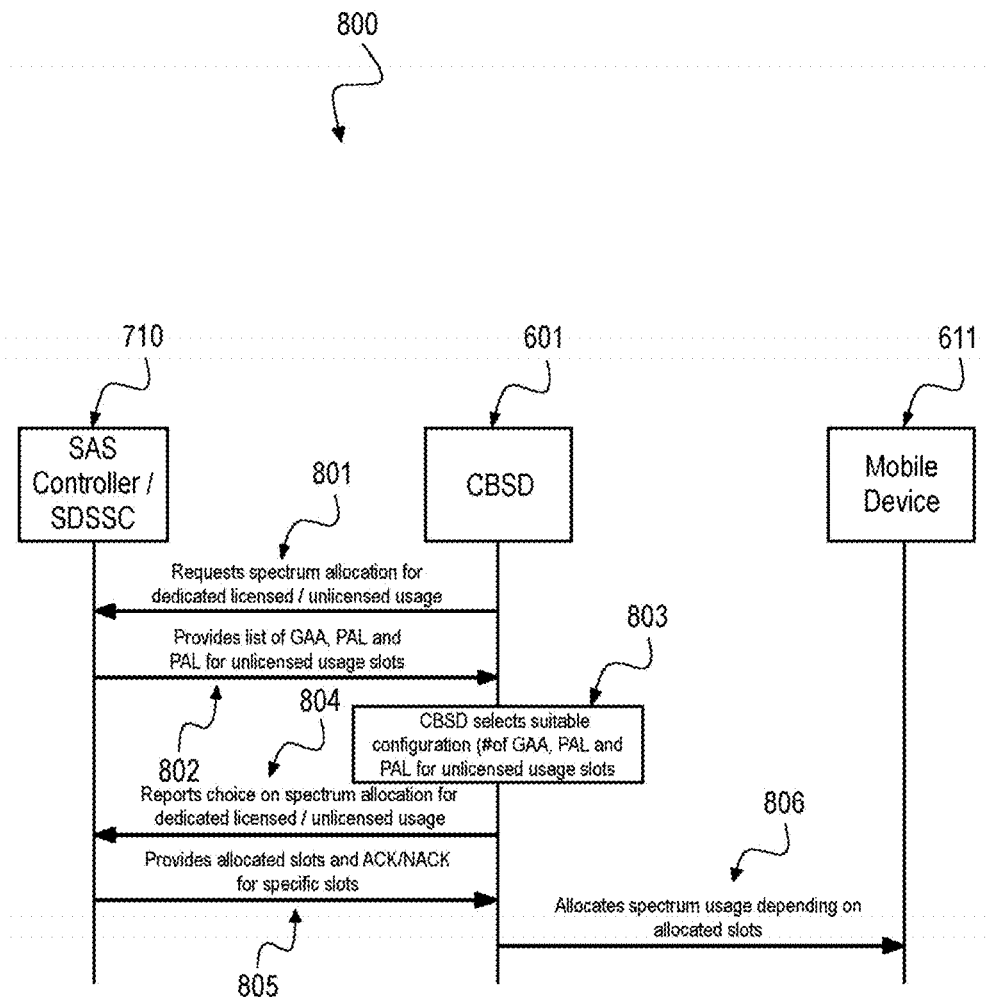
FIG. 8 is a schematic diagram illustrating an exemplary message flow 800 between an SAS controller/SDSSC, a Citizen Broadband Service Device (CBSD) and a mobile device.

FIG. 8 is a schematic diagram illustrating an exemplary message flow 800 between an SAS controller/SDSSC 710, a Citizen Broadband Service Device (CBSD) 601 and a mobile device. The functionality of the SAS controller/SDSSC 710 may be implemented by the SAS controller 131, 132 (see FIGS. 1 and 6) or by the SDSSC 301 (see FIGS. 3 and 6). The CBSD may be a base station circuitry or an eNodeB circuitry or an access point circuitry.

From a high level perspective, a concerned CBSD would access the spectrum as illustrated in the flow chart of FIG. 8. The message flow is as follows: In a first message 801 from CBSD 601 to SAS Controller/SDSSC 710, the CBSD 601 requests spectrum allocation for dedicated licensed or unlicensed usage. In a second message 802 from SAS Controller/SDSSC 710 to CBSD 601 the SAS controller/SDSSC answers by providing a list of GAA, PAL and PAL for unlicensed usage slots. Then the CBSD 601 selects suitable configuration 803 (e.g. number of GAA, PAL and PAL for unlicensed usage slots). In a third message 804 from CBSD 601 to SAS Controller/SDSSC 710, the CBSD 601 reports choice on spectrum allocation for dedicated licensed or unlicensed usage. In a fourth message 805 from SAS Controller/SDSSC 710 to CBSD 601 the SAS controller/SDSSC answers by providing allocated slots and ACK/NACK for specific slots. In a fifth message 806 from CBSD 601 to mobile device 611 the CBSD 601 provides allocated spectrum usage depending on allocated slots to mobile device 611.

By using the concept described in this disclosure, it is thus possible to introduce further degrees of freedom on how to exploit PAL and GAA spectrum. This improves the overall spectrum efficiency. This concept can be translated into the usage of Service Interfaces of the SDSSC as described below with respect to FIGS. 9 to 13.

FIG. 9 is a schematic diagram illustrating an exemplary message flow 900 at the interface between SDSSC and SAS. This interface is used by SDSSC 301 to inform SAS about authorized secondary users of the PAL license bands for use during registration of CBSD.

The message flow is as follows: In a first message 901 from CBSD 601 to SDSSC 301, the CBSD 601 agrees on PAL bands/census tracts for sharing. In a second message 902 from SDSSC 301 to SAS Controller 131, the SDSSC 301 provides information on shared PAL bands. In a third message 903 from SAS Controller 131 to CBSD 601, the SAS Controller 131 informs the CBSD 601 about allocation of shared PAL bands. In a fifth message 905 from CBSD 601 to mobile device 611, the CBSD 601 informs mobile device 611 about allocation of shared PAL bands.

Figure 10:
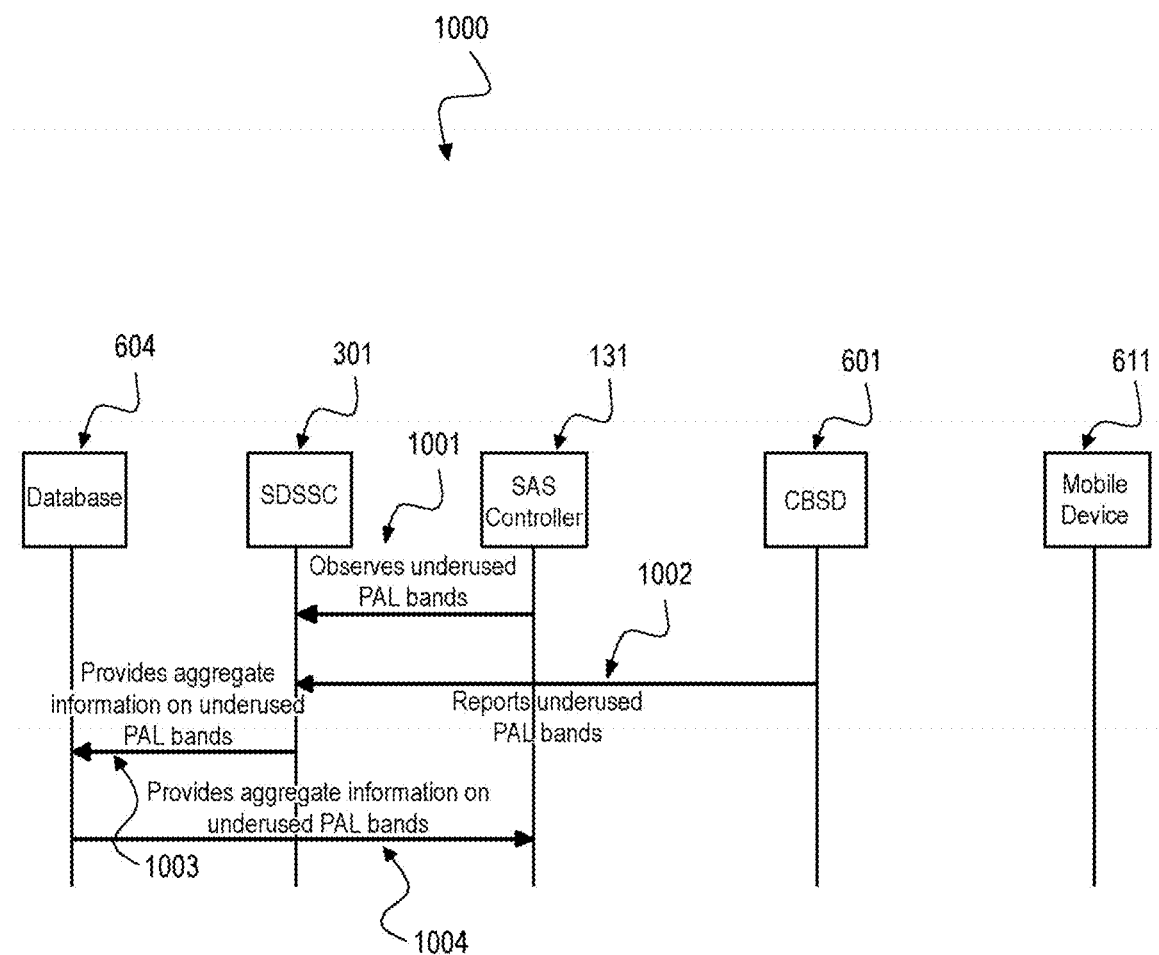
FIG. 10 is a schematic diagram illustrating an exemplary message flow 1000 at the interface between SDSSC and Spectrum pool.

FIG. 10 is a schematic diagram illustrating an exemplary message flow 1000 at the interface between SDSSC and Spectrum pool. This updates the database of secondary pool with under-utilized PAL licensed bands.

The message flow is as follows: In a first message 1001 from SAS Controller 131 to SDSSC 301, the SAS Controller 131 informs the SDSSC 301 about observing underused PAL bands. In a second message 1002 from CBSD 601 to SDSSC 301, CBSD 601 reports underused PAL bands to SDSSC 301. In a third message 1003 from SDSSC 301 to database 604, the SDSSC 301 provides aggregated information on underused PAL bands to database 604. In a fourth message 1004 from database 604 to SAS controller 131, the database 604 provides aggregate information on underused PAL bands to SAS Controller 131.

Figure 11:
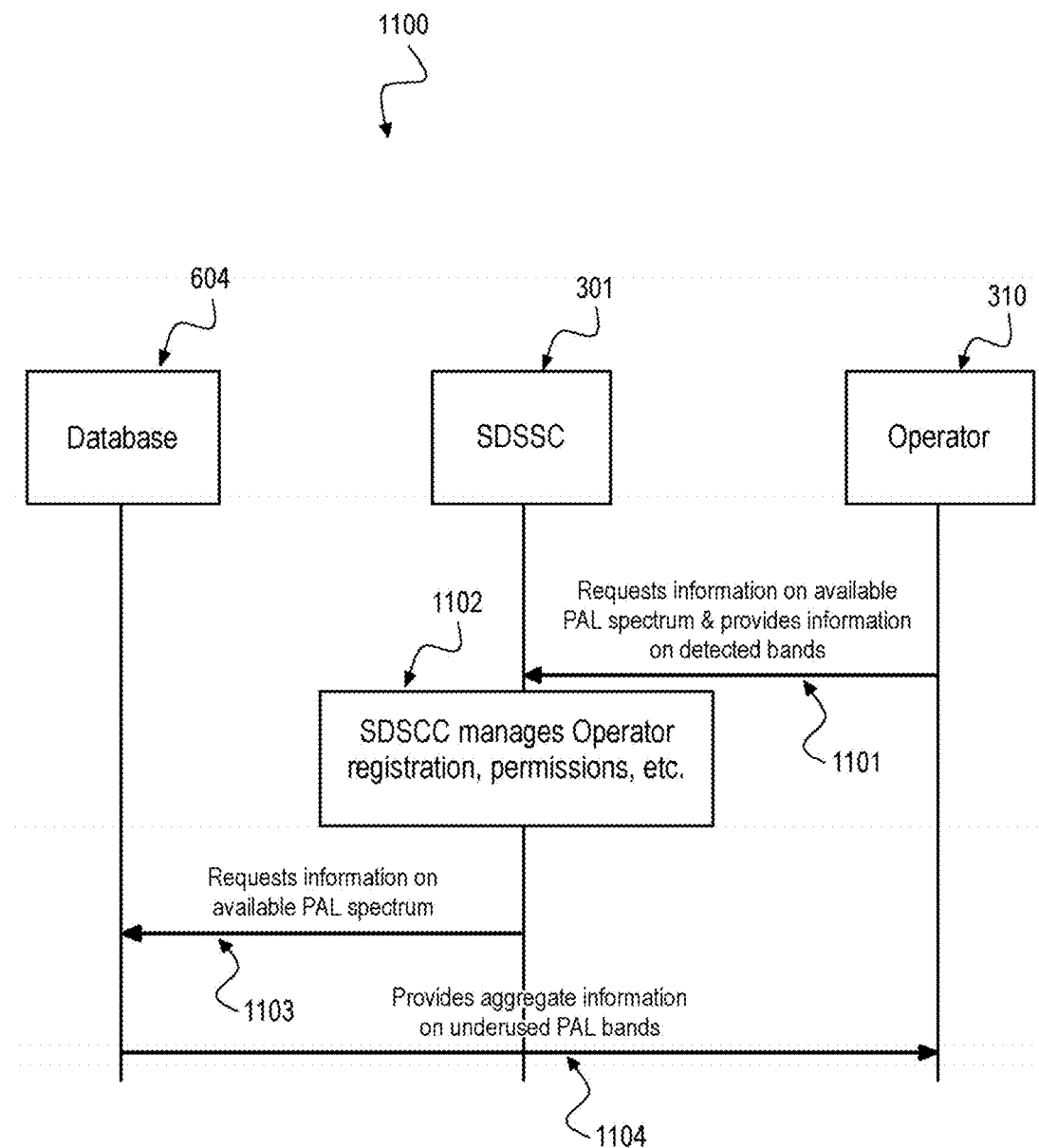
FIG. 11 is a schematic diagram illustrating an exemplary message flow 1100 at the interface between SDSSC and network operator.

FIG. 11 is a schematic diagram illustrating an exemplary message flow 1100 at the interface between SDSSC and network operator. This SDSSC-Operator interface is used in direction SDSSC→Operator for authorization for use of shared pool of spectrum and in direction Operator→SDSSC for information about detected bands.

The message flow 1100 is as follows: In a first message 1101 from operator 310 to SDSSC 301, the operator 310 requests information on available PAL spectrum and provides information on detected band to SDSSC 301. The SDSSC manages 1102 operator registrations, permissions, etc. In a second message 1103 from SDSSC 301 to database 604, the SDSSC 301 requests information on available PAL spectrum from database 604. In a third message 1104 from database 604 to operator 310, the database 604 provides aggregate information on underused PAL bands to operator 310.

Figure 12:
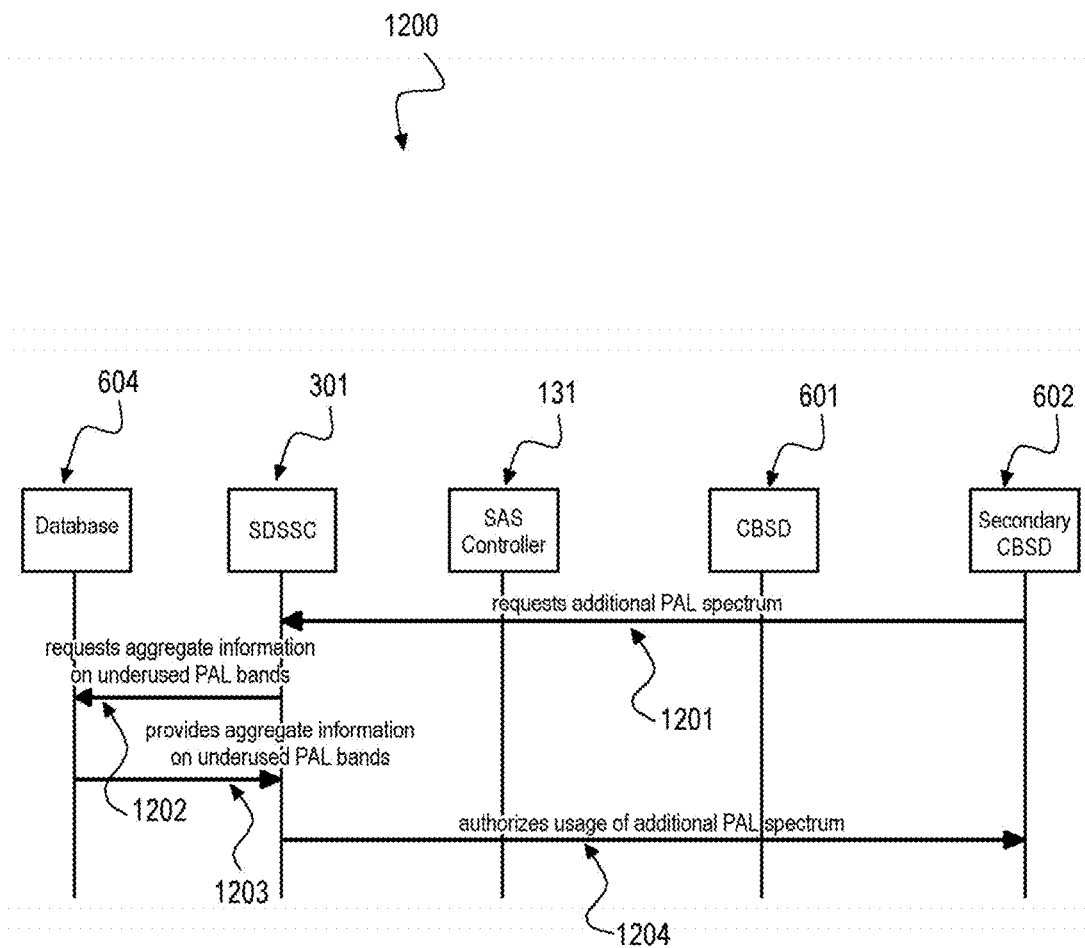
FIG. 12 is a schematic diagram illustrating an exemplary message flow 1200 at the interface between SDSSC and CBSD.

FIG. 12 is a schematic diagram illustrating an exemplary message flow 1200 at the interface between SDSSC and CBSD. The SDSSC-CBSD interface can be used to inform secondary operator CBSD about the authorizations from PAL licensees. This information can be used during SAS registration.

The message flow 1200 is as follows: In a first message 1201 from secondary CBSD 602 to SDSSC 301, the secondary CBSD 602 requests additional PAL spectrum from SDSSC 301. In a second message 1202 from SDSSC 301 to database 604, the SDSSC 301 requests aggregate information on underused PAL bands form database 604. In a third message 1203 from database 604 to SDSSC 301, the database answers by providing aggregate information on underused PAL bands. In a fourth message 1204 from SDSSC 301 to secondary CBSD 602, the SDSSC 301 authorizes usage of additional PAL spectrum.

Figure 13:
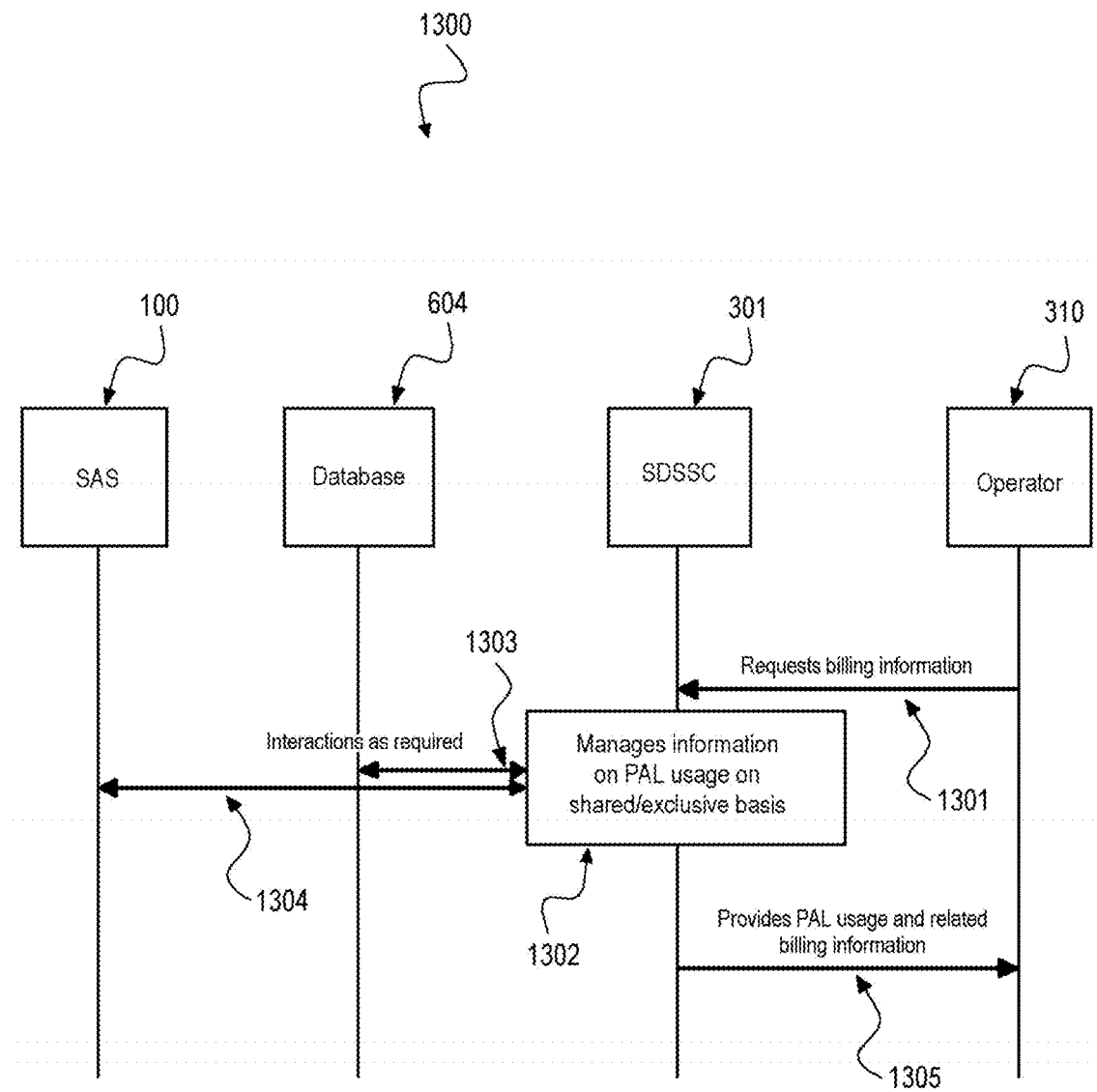
FIG. 13 is a schematic diagram illustrating an exemplary message flow 1300 at the interface between SDSSC and billing system.

FIG. 13 is a schematic diagram illustrating an exemplary message flow 1300 at the interface between SDSSC and billing system. The SDSSC-Billing interface collects the statistics on usage spectrum resource per-cell for every PAL licensed band. This is normalized to channel busy-time percentage. Parameters are: {cell_id, Operator_identifier, busy-time_percentage}.

The message flow 1300 is as follows: In a first message 1301 from network operator 310 to SDSSC 301, the operator 310 requests billing information. The SDSSC 301 manages 1302 information on PAL usage on shared/exclusive basis. In a second message 1303 from SDSSC 301 to database 604, the SDSSC 301 interacts with the database 604. In a third message 1304 from SDSSC 301 and SAS 100, the SDSSC 301 interacts with the SAS system 100. In a fourth message 1305 from SDSSC 301 to operator 310, the SDSSC 301 provides PAL usage and related billing information.

A similar process is used for the SDSSC-Usage Statistics interface and the SDSSC-Analytics interface.

Figure 14:
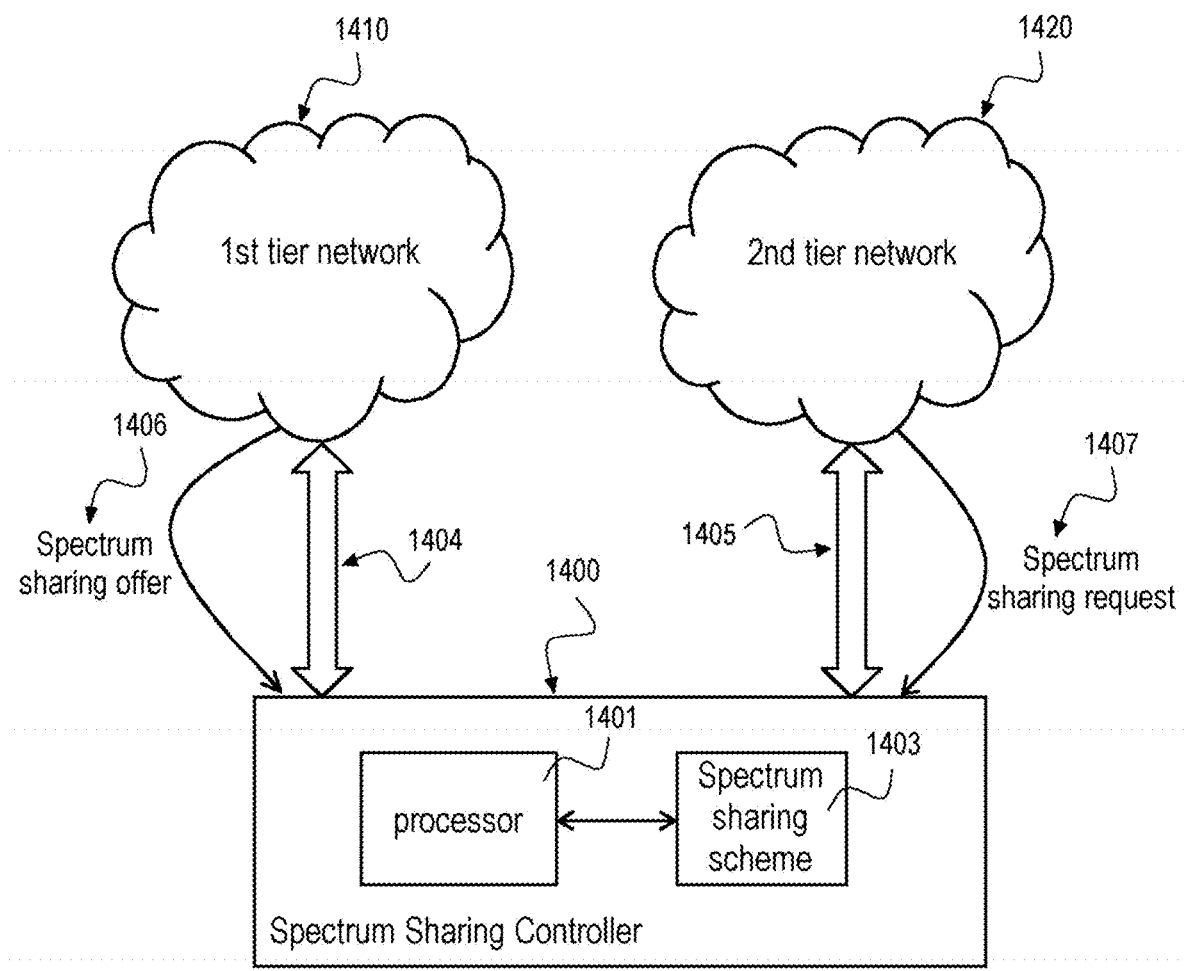
FIG. 14 is schematic diagram illustrating a spectrum sharing controller 1400 according to the disclosure.

FIG. 14 is schematic diagram illustrating a spectrum sharing controller 1400 according to the disclosure. The spectrum sharing controller 1400 is an exemplary implementation of the Software Defined Spectrum Sharing Controller (SDSSC) 301 described above with respect to FIGS. 3 to 13. The functionalities of the SDSSC 301 may be implemented in software, e.g. by programs running on the processor of the spectrum sharing controller 1400 described below or may be implemented in hardware, e.g. by specific hardware logic or application specific integrated circuits forming the processor as described below.

The spectrum sharing controller 1400 includes an interface to a sharable spectrum, wherein the sharable spectrum is assigned to a first hierarchy level. The spectrum sharing controller 1400 further includes a processor 1401 configured to enable a first entity for accessing at least part of the sharable spectrum on the first hierarchy level. The processor 1401 is configured to assign a second hierarchy level to the at least part of the sharable spectrum accessible to the first entity. The processor 1401 is configured to enable a second entity for accessing at least part of the sharable spectrum on the second hierarchy level. The term "spectrum sharing controller" shall be interpreted in a broad manner, i.e. not limited to the "SAS Controller" of a CBSD system. The spectrum sharing controller 1400 can be in any network equipment, e.g. CBSD/eNB/AP/SAS Controller/etc. Even a UE may take this role in some circumstances, e.g. for CBSD tier-3 spectrum usage where a UE could for example take a coordinating role (such as a cluster head or similar in for example an automotive applications scenario or similar) and perform the corresponding spectrum assignment (e.g., to other tier-3 and potentially tier-2 users).

The processor 1401 may combine sharable spectrum on multiple identical or distinct hierarchy levels and may enable a third entity for accessing the combined sharable spectrum. The processor 1401 may enable an entity for accessing the sharable spectrum based an auction, an offer at a fixed prize, accessible for free for a limited amount of time, accessible for another service in return, an offer at a negotiated price, evaluation of achievable target QoS and/or evaluation of overall efficiency. The processor 1401 may further combine sharable spectrum with other types of spectrum including unlicensed spectrum, any type of White Space spectrum, licensed spectrum and/or spectrum under license-by-rule regime.

The Spectrum Sharing Controller 1400 includes a (first) interface 1404 with a first tier network 1410, a (second) interface 1405 with a second tier network 1420 and a processor 1401. The first interface 1404 is configured to receive a spectrum sharing offer 1406 for sharing at least a portion of a radio spectrum assigned to the first tier network 1410. The second interface 1405 with the second tier network 1420 is configured to receive a spectrum sharing request 1407 for sharing at least the portion of the radio spectrum. The processor 1401 is configured to assign access for the second tier network 1420 to at least the portion of the radio spectrum based on a spectrum sharing scheme 1403 with respect to the spectrum sharing offer 1406 and the spectrum sharing request 1407. The radio spectrum may be a radio spectrum of an SAS system 100 described above with respect to FIG. 1, e.g. within 3550-3650 MHz) or a radio spectrum of an LSA system 200 described above with respect to FIG. 2a.

The spectrum sharing scheme 1403 may, for example, be based on an optimization criterion, e.g. in form of an auction, with respect to information received from the spectrum sharing offer 1406 and information received from the spectrum sharing request 1407.

The optimization criterion (or auction) may be based on an amount of available spectrum indicated by the spectrum sharing offer 1406 and an amount of requested spectrum indicated by the spectrum sharing request 1407.

The Spectrum Sharing Controller 1400 may further include an interface (not depicted) with a database, e.g. a database 604 as described above with respect to FIGS. 6 to 13. The processor 1401 may be configured to store information about sharable portions of the radio spectrum in the database 604. The processor 1401 may update the database 604 based on assigned portions of the radio spectrum.

The processor 1401 may provide information about available portions of the radio spectrum to the second tier network 1420 and may assign access to the available portions of the radio spectrum based on a confirmation received from the second tier network 1420, e.g. as described above with respect to FIGS. 8 to 13.

The spectrum sharing request 1407 may be received from the second tier network 1420 based on a registration of the second tier network 1420 with the Spectrum Sharing Controller 1400.

The portion of the radio spectrum may be a portion with respect to time, frequency and/or geographic location, e.g. within a radio resource 500 as described above with respect to FIG. 5.

The first tier network 1410 and the second tier network 1420 may be radio networks of a Spectrum Access System (SAS) or radio networks of a Licensed Shared Access System (LSA), e.g. as described above with respect to FIGS. 1 and 2.

The processor 1401 may share the radio spectrum between a Priority Access License (PAL) radio network and a Generalized Authorized Access (GAA) radio network, e.g. as described above with respect to FIGS. 3 to 13. The processor 1401 may assign the GAA radio network access to a portion of the radio spectrum owned by the PAL radio network, e.g. as described above with respect to FIGS. 3 to 13. For example, the portion of the radio spectrum owned by the PAL radio network may be smaller than a full bandwidth of the radio spectrum. The processor 1401 may share the radio spectrum based on a combination of a Primary Spectrum (PS) pool, a Secondary Spectrum (SS) pool and a Tertiary Spectrum (TS) pool, e.g. as described above with respect to FIG. 4. The PS pool is a portion of the radio spectrum guaranteed to a radio network, the SS pool is a portion of the radio spectrum assigned to the radio network on an interference free basis and the TS pool is a portion of the radio spectrum assigned to the radio network based on the spectrum sharing scheme 1403.

The Spectrum Sharing Controller 1400 may further include an interface with an SAS controller, e.g. as described above with respect to FIGS. 6 to 13. The processor 1401 may provide information about shared PAL bands and/or second tier networks assigned access to the shared PAL bands to the SAS controller, e.g. the SAS controller 131 as described above with respect to FIGS. 1 to 13.

The Spectrum Sharing Controller 1400 may further include an interface with a radio network of a secondary Citizen Broadband Radio Service (CBSD), e.g. a CBSD 602 as described above with respect to FIG. 12. The processor 1401 may provide information about authorizations for PAL bands of a primary CBSD, e.g. a primary CBSD 601 as described above with respect to FIG. 6, to the secondary CBSD 602.

The Spectrum Sharing Controller 1400 may further include an interface with a billing system, e.g. as described above with respect to FIG. 13. The processor 1401 may provide information about usage of shared PAL bands of the radio spectrum to the billing system, e.g. spectrum billing systems 303 as described above with respect to FIG. 3.

The Spectrum Sharing Controller 1400 may further include an interface with a statistics system, e.g. as described above with respect to FIG. 13. The processor 1401 may provide information about usage statistics of shared PAL bands of the radio spectrum to the statistics system.

Figure 15:
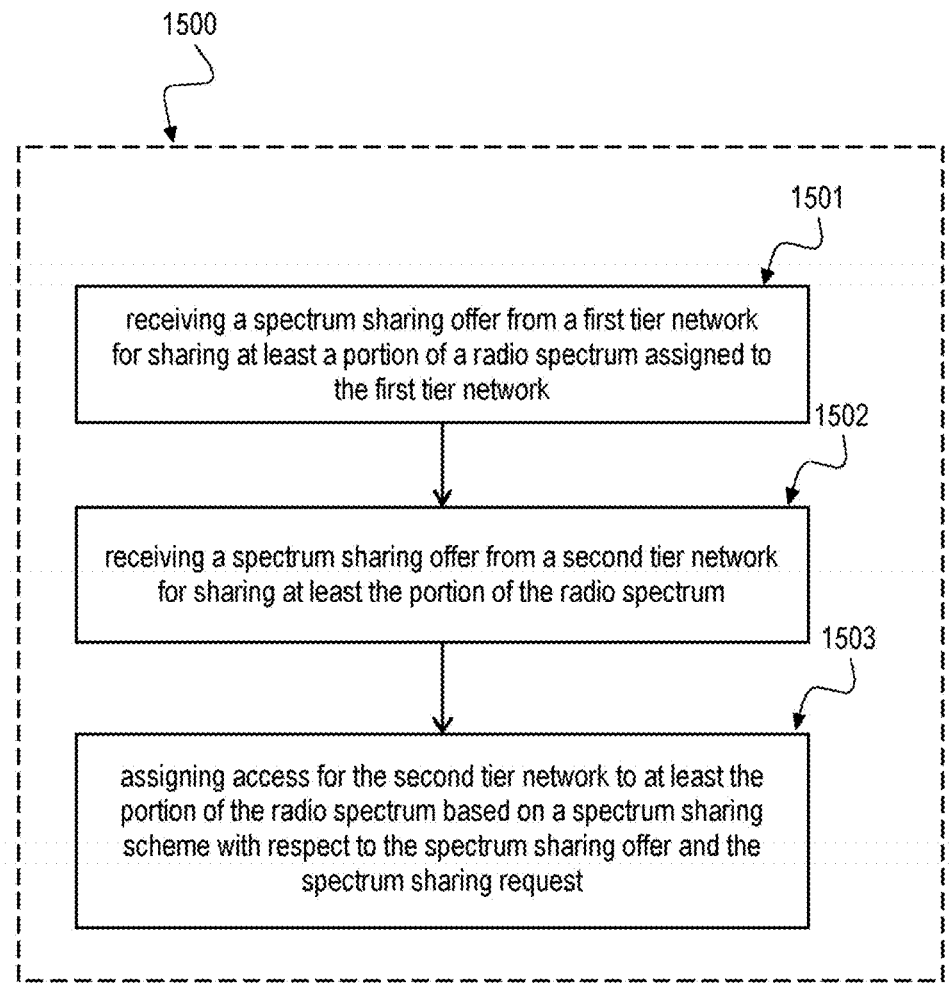
FIG. 15 is schematic diagram illustrating a spectrum sharing method 1500 according to the disclosure.

FIG. 15 is schematic diagram illustrating a spectrum sharing method 1500 according to the disclosure. The method 1500 includes receiving 1501 a spectrum sharing offer 1406 from a first tier network 1410 for sharing at least a portion of a radio spectrum assigned to the first tier network 1410, e.g. as described above with respect to FIG. 14. The method 1500 includes receiving 1502 a spectrum sharing request 1407 from a second tier network 1420 for sharing at least the portion of the radio spectrum, e.g. as described above with respect to FIG. 14. The method 1500 further includes assigning access for the second tier network 1420 to at least the portion of the radio spectrum based on a spectrum sharing scheme 1403 with respect to the spectrum sharing offer 1406 and the spectrum sharing request 1407, e.g. as described above with respect to FIG. 14. The method 1500 may include the other functionalities as described above with respect to FIG. 14 and may be performed by a processor 1401 as described above with respect to FIG. 14.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 1500 as described above with respect to FIG. 15 and the techniques described with respect to FIGS. 1 to 14. Such a computer program product may include a readable storage medium storing program code thereon for use by a processor, the program code comprising instructions for performing any of the methods as described above.

EXAMPLES

The following examples pertain to further embodiments. Example 1 is a spectrum sharing controller, comprising: an interface to a sharable spectrum, wherein the sharable spectrum is assigned to a first hierarchy level; a processor configured to enable a first entity for accessing at least part of the sharable spectrum on the first hierarchy level, wherein the processor is configured to assign a second hierarchy level to the at least part of the sharable spectrum accessible to the first entity, and wherein the processor is configured to enable a second entity for accessing at least part of the sharable spectrum on the second hierarchy level.

In Example 2, the subject matter of Example 1 can optionally include that the processor is configured to combine sharable spectrum on multiple identical or distinct hierarchy levels and to enable a third entity for accessing the combined sharable spectrum; and that the processor is further configured to combine sharable spectrum with other types of spectrum including unlicensed spectrum such as ISM (Industrial Scientific and Medical) bands, etc., any type of White Space spectrum, i.e. any spectrum not occupied by an incumbent user, e.g. TV White Spaces, licensed spectrum, e.g., LTE licensed spectrum and/or spectrum under (FCC) license-by-rule regime, etc.

In Example 3, the subject matter of any one of Examples 1-2 can optionally include that the processor is configured to enable an entity for accessing the sharable spectrum based on at least one of the following: an auction, an offer at a fixed prize, accessible for free for a limited amount of time, accessible for another service in return, an offer at a negotiated price, evaluation of achievable target QoS, i.e., can be data rate/latency/etc. targets to be achieved, evaluation of overall efficiency, e.g. in terms of cost, power consumption, etc.

In Example 4, the subject matter of any one of Examples 1-3 can optionally include: an interface with a first tier network, configured to receive a spectrum sharing offer for sharing at least a portion of a radio spectrum assigned to the first tier network; an interface with a second tier network, configured to receive a spectrum sharing request for sharing at least the portion of the radio spectrum; and that the processor is configured to assign access for the second tier network to at least the portion of the radio spectrum based on a spectrum sharing scheme with respect to the spectrum sharing offer and the spectrum sharing request.

In Example 5, the subject matter of Example 4 can optionally include that the spectrum sharing scheme is based on an auction with respect to the spectrum sharing offer and the spectrum sharing request.

In Example 6, the subject matter of any one of Examples 4-5 can optionally include that the auction is based on an amount of available spectrum indicated by the spectrum sharing offer and an amount of requested spectrum indicated by the spectrum sharing request.

In Example 7, the subject matter of any one of Examples 4-6 can optionally include: an interface with a database, wherein the processor is configured to store information about sharable portions of the radio spectrum in the database.

In Example 8, the subject matter of Example 7 can optionally include that the processor is configured to update the database based on assigned portions of the radio spectrum.

In Example 9, the subject matter of any one of Examples 4-8 can optionally include that the processor is configured to provide information about available portions of the radio spectrum to the second tier network and to assign access to the available portions of the radio spectrum based on a confirmation received from the second tier network.

In Example 10, the subject matter of any one of Examples 4-9 can optionally include that the spectrum sharing request is received from the second tier network based on a registration of the second tier network with the Spectrum Sharing Controller.

In Example 11, the subject matter of any one of Examples 4-10 can optionally include that the portion of the radio spectrum is a portion with respect to time, frequency and/or geographic location.

In Example 12, the subject matter of any one of Examples 4-5 can optionally include that the first tier network and the second tier network are radio networks of a Spectrum Access System (SAS) or radio networks of a Licensed Shared Access System (LSA).

In Example 13, the subject matter of Example 12 can optionally include that the processor is configured to share the radio spectrum between a Priority Access License (PAL) radio network and a Generalized Authorized Access (GAA) radio network.

In Example 14, the subject matter of Example 13 can optionally include that the processor is configured to assign the GAA radio network access to a portion of the radio spectrum owned by the PAL radio network.

In Example 15, the subject matter of Example 14 can optionally include that the portion of the radio spectrum owned by the PAL radio network is smaller than a full bandwidth of the radio spectrum.

In Example 16, the subject matter of any one of Examples 12-15 can optionally include that the processor is configured to share the radio spectrum based on a combination of a Primary Spectrum (PS) pool, a Secondary Spectrum (SS) pool and a Tertiary Spectrum (TS) pool, wherein the PS pool is a portion of the radio spectrum guaranteed to a radio network, the SS pool is a portion of the radio spectrum assigned to the radio network on an interference free basis and the TS pool is a portion of the radio spectrum assigned to the radio network based on the spectrum sharing scheme.

In Example 17, the subject matter of any one of Examples 12-16 can optionally include an interface with an SAS controller, wherein the processor is configured to provide information about shared PAL bands and/or second tier networks assigned access to the shared PAL bands to the SAS controller.

In Example 18, the subject matter of any one of Examples 12-17 can optionally include an interface with a radio network of a secondary Citizen Broadband Radio Service (CBSD), wherein the processor is configured to provide information about authorizations for PAL bands of a primary CBSD to the secondary CBSD.

In Example 19, the subject matter of any one of Examples 12-18 can optionally include an interface with a billing system, wherein the processor is configured to provide information about usage of shared PAL bands of the radio spectrum to the billing system.

In Example 20, the subject matter of any one of Examples 12-19 can optionally include an interface with a statistics system, wherein the processor is configured to provide information about usage statistics of shared PAL bands of the radio spectrum to the statistics system.

Example 21 is a method for spectrum sharing, the method comprising: receiving a spectrum sharing offer from a first tier network for sharing at least a portion of a radio spectrum assigned to the first tier network; receiving a spectrum sharing request from a second tier network for sharing at least the portion of the radio spectrum; and assigning access for the second tier network to at least the portion of the radio spectrum based on a spectrum sharing scheme with respect to the spectrum sharing offer and the spectrum sharing request.

In Example 22, the subject matter of Example 21 can optionally include that the spectrum sharing scheme is based on an auction with respect to the spectrum sharing offer and the spectrum sharing request.

In Example 23, the subject matter of Example 22 can optionally include that the auction is based on an amount of available spectrum indicated by the spectrum sharing offer and an amount of requested spectrum indicated by the spectrum sharing request.

In Example 24, the subject matter of any one of Examples 21-23 can optionally include storing information about sharable portions of the radio spectrum in a database.

In Example 25, the subject matter of Example 24 can optionally include updating the database based on assigned portions of the radio spectrum.

In Example 26, the subject matter of any one of Examples 21-25 can optionally include: providing information about available portions of the radio spectrum to the second tier network; and assigning access to the available portions of the radio spectrum based on a confirmation received from the second tier network.

In Example 27, the subject matter of any one of Examples 21-26 can optionally include: receiving the spectrum sharing request from the second tier network based on a registration of the second tier network for the Spectrum Sharing.

In Example 28, the subject matter of any one of Examples 21-27 can optionally include that the portion of the radio spectrum is a portion with respect to time, frequency and/or geographic location.

In Example 29, the subject matter of any one of Examples 21-28 can optionally include that the first tier network and the second tier network are radio networks of a Spectrum Access System (SAS) or radio networks of a Licensed Shared Access System (LSA).

In Example 30, the subject matter of Example 29 can optionally include: sharing the radio spectrum the between a Priority Access License (PAL) radio network and a Generalized Authorized Access (GAA) radio network.

In Example 31, the subject matter of Example 30 can optionally include assigning the GAA radio network access to a portion of the radio spectrum owned by the PAL radio network.

In Example 32, the subject matter of Example 31 can optionally include that the portion of the radio spectrum owned by the PAL radio network is smaller than a full bandwidth of the radio spectrum.

In Example 33, the subject matter of any one of Examples 29-32 can optionally include: sharing the radio spectrum based on a combination of a Primary Spectrum (PS) pool, a Secondary Spectrum (SS) pool and a Tertiary Spectrum (TS) pool, wherein the PS pool is a portion of the radio spectrum guaranteed to a radio network, the SS pool is a portion of the radio spectrum assigned to the radio network on an interference free basis and the TS pool is a portion of the radio spectrum assigned to the radio network based on the spectrum sharing scheme.

In Example 34, the subject matter of any one of Examples 29-33 can optionally include: providing information about shared PAL bands and/or the second tier network assigned access to the shared PAL bands to an SAS controller.

In Example 35, the subject matter of any one of Examples 29-34 can optionally include: providing information about authorizations for PAL bands of a primary Citizen Broadband Radio Service (CBSD) to a secondary CBSD.

In Example 36, the subject matter of any one of Examples 29-35 can optionally include: providing information about usage of shared PAL bands of the radio spectrum to a billing system.

In Example 37, the subject matter of any one of Examples 29-36 can optionally include: providing information about usage statistics of shared PAL bands of the radio spectrum to a statistics system.

Example 38 is a Spectrum Sharing Controller circuit, comprising: an interface with a plurality of radio networks, configured to receive a spectrum sharing offer from at least one first radio network of the plurality of radio networks for sharing at least a portion of a radio spectrum assigned to the at least one first radio network, and configured to receive a spectrum sharing request from at least one second radio network of the plurality of radio networks for sharing at least the portion of the radio spectrum; and a processor configured to assign access for the at least one second radio network to at least the portion of the radio spectrum based on a spectrum sharing scheme with respect to the spectrum sharing offer and the spectrum sharing request.

In Example 39, the subject matter of Example 38 can optionally include that the spectrum sharing scheme is based on an auction with respect to the spectrum sharing offer and the spectrum sharing request.

In Example 40, the subject matter of Example 39 can optionally include that the auction is based on an amount of available spectrum indicated by the spectrum sharing offer and an amount of requested spectrum indicated by the spectrum sharing request.

In Example 41, the subject matter of any one of Examples 38-40 can optionally include: an interface with a database, wherein the processor is configured to store information about sharable portions of the radio spectrum in the database.

In Example 42, the subject matter of Example 41 can optionally include that the processor is configured to update the database based on assigned portions of the radio spectrum.

Example 43 is a device for spectrum sharing, the device comprising: means for receiving a spectrum sharing offer from a first tier network for sharing at least a portion of a radio spectrum assigned to the first tier network; means for receiving a spectrum sharing request from a second tier network for sharing at least the portion of the radio spectrum; and means for assigning access for the second tier network to at least the portion of the radio spectrum based on a spectrum sharing scheme with respect to the spectrum sharing offer and the spectrum sharing request.

In Example 44, the subject matter of Example 43 can optionally include that the spectrum sharing scheme is based on an auction with respect to the spectrum sharing offer and the spectrum sharing request.

Example 45 is a Spectrum Sharing System, comprising: a Spectrum Access System (SAS) configured to share a radio spectrum between an incumbent first tier network, a priority access license (PAL) second tier network and a generalized authorized access (GAA) third tier network; and a Spectrum Sharing Controller, comprising: an interface with the second tier network, configured to receive a spectrum sharing offer for sharing at least a portion of the radio spectrum assigned to the second tier network; an interface with the third tier network, configured to receive a spectrum sharing request for sharing at least the portion of the radio spectrum; and a processor configured to assign access for the third tier network to at least the portion of the radio spectrum based on a spectrum sharing scheme with respect to the spectrum sharing offer and the spectrum sharing request.

In Example 46, the subject matter of Example 45 can optionally include that the spectrum sharing scheme is based on an auction with respect to the spectrum sharing offer and the spectrum sharing request.

Example 47 is a Spectrum Sharing System, comprising: a Licensed Shared Access (LSA) system configured to share a radio spectrum between an incumbent first tier network and a licensed second tier network; and a Spectrum Sharing Controller, comprising: an interface with the first tier network, configured to receive a spectrum sharing offer for sharing at least a portion of the radio spectrum assigned to the first tier network; an interface with the second tier network, configured to receive a spectrum sharing request for sharing at least the portion of the radio spectrum; and a processor configured to assign access for the second tier network to at least the portion of the radio spectrum based on a spectrum sharing scheme with respect to the spectrum sharing offer and the spectrum sharing request.

In Example 48, the subject matter of Example 47 can optionally include that the spectrum sharing scheme is based on an auction with respect to the spectrum sharing offer and the spectrum sharing request.

In Example 49, the subject matter of any one of Examples 47-48 can optionally include that the portion of the radio spectrum is a portion with respect to time, frequency and/or geographic location.

Example 50 is a computer readable non-transitory medium on which computer instructions are stored which when executed by a computer cause the computer to perform the method of any one of Examples 21 to 37.

Example 51 is a user equipment, UE, comprising: a receiver, configured to receive a query from an access point or a Citizen Broadband Radio Service (CBSD), wherein the query indicates a compatibility of a sharable spectrum and/or an intention to use the sharable spectrum; and a transmitter, configured to transmit an answer to the query, the answer comprising an acknowledgement or a decline for using the sharable spectrum.

In Example 52, the subject matter of Example 51 can optionally include that the compatibility indicates if the UE is compatible to Spectrum Access System (SAS) bands and/or services of the access point or CBSD.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A Spectrum Sharing Controller, comprising:
a first interface with a first tier network that is prioritized to access a sharable radio spectrum on a first hierarchy level, wherein the sharable radio spectrum is assigned to the first hierarchy level;
a second interface with a second tier network that is prioritized to access the sharable radio spectrum on a second hierarchy level;
a processor configured to enable a first entity for accessing at least a portion of the sharable radio spectrum on the first hierarchy level,
wherein the first interface is configured to receive a spectrum sharing offer for sharing the portion the sharable radio spectrum,
wherein the second interface is configured to receive a spectrum sharing request for sharing the portion of the sharable radio spectrum, and
wherein the processor is configured to:
assign access on the second hierarchy level to the portion of the sharable spectrum accessible to the first entity based on a spectrum sharing scheme with respect to the spectrum sharing offer and the spectrum sharing request,
enable a second entity for accessing at least part of the sharable radio spectrum on the second hierarchy level,
combine the shamble radio spectrum with other types of spectrum including unlicensed spectrum, any type of White Space spectrum, licensed spectrum and/or spectrum under license-by-rule regime based on multiple identical or distinct hierarchy levels and to enable a third entity for accessing the combined radio sharable spectrum.

2. The Spectrum Sharing Controller of claim 1, wherein the processor is configured to enable an entity for accessing the sharable radio spectrum based on at least one of the following:
an auction,
an offer at a fixed prize,
accessible for free for a limited amount of time,
accessible for another service in return,
an offer at a negotiated price,
evaluation of achievable target QoS,
evaluation of overall efficiency.

3. The Spectrum Sharing Controller of claim 1, wherein the spectrum sharing scheme is based on an auction with respect to the spectrum sharing offer and the spectrum sharing request.

4. The Spectrum Sharing Controller of claim 3, wherein the auction is based on an amount of available spectrum indicated by the spectrum sharing offer and an amount of requested spectrum indicated by the spectrum sharing request.

5. The Spectrum Sharing Controller of claim 1, comprising:
an interface with a database,
wherein the processor is configured to store information about sharable portions of the radio spectrum in the database.

6. The Spectrum Sharing Controller of claim 5, wherein the processor is configured to update the database based on assigned portions of the radio spectrum.

7. The Spectrum Sharing Controller of claim 1, wherein the processor is configured to provide information about available portions of the radio spectrum to the second tier network and to assign access to the available portions of the radio spectrum based on a confirmation received from the second tier network.

8. The Spectrum Sharing Controller of claim 1, wherein the spectrum sharing request is received from the second tier network based on a registration of the second tier network with the Spectrum Sharing Controller.

9. The Spectrum Sharing Controller of claim 1, wherein the portion of the radio spectrum is a portion with respect to time, frequency and/or geographic location.

10. The Spectrum Sharing Controller of claim 1, wherein the first tier network and the second tier network are radio networks of a Spectrum Access System (SAS) or radio networks of a Licensed Shared Access System (LSA).

11. The Spectrum Sharing Controller of claim 10, wherein the processor is configured to share the radio spectrum between a Priority Access License (PAL) radio network and a Generalized Authorized Access (GAA) radio network.

12. The Spectrum Sharing Controller of claim 11, wherein the processor is configured to assign the GAA radio network access to a portion of the radio spectrum owned by the PAL radio network.

13. The Spectrum Sharing Controller of claim 11, wherein the portion of the radio spectrum owned by the PAL radio network is smaller than a full bandwidth of the radio spectrum.

14. The Spectrum Sharing Controller of claim 10, wherein the processor is configured to share the radio spectrum based on a combination of a Primary Spectrum (PS) pool, a Secondary Spectrum (SS) pool and a Tertiary Spectrum (TS) pool,
wherein the PS pool is a portion of the radio spectrum guaranteed to a radio network, the SS pool is a portion of the radio spectrum assigned to the radio network on an interference free basis and the TS pool is a portion of the radio spectrum assigned to the radio network based on the spectrum sharing scheme.

15. The Spectrum Sharing Controller of claim 10, comprising:
an interface with an SAS controller,
wherein the processor is configured to provide information about shared PAL bands and/or second tier networks assigned access to the shared PAL bands to the SAS controller.

16. The Spectrum Sharing Controller of claim 10, comprising:
an interface with a radio network of a secondary Citizen Broadband Radio Service (CBSD),
wherein the processor is configured to provide information about authorizations for PAL bands of a primary CBSD to the secondary CBSD.

17. The Spectrum Sharing Controller of claim 10, comprising:
an interface with a billing system,
wherein the processor is configured to provide information about usage of shared PAL bands of the radio spectrum to the billing system.

18. The Spectrum Sharing Controller of claim 10, comprising:
an interface with a statistics system,
wherein the processor is configured to provide information about usage statistics of shared PAL bands of the radio spectrum to the statistics system.

19. A method for spectrum sharing, the method comprising:

enabling a first entity for accessing a portion of sharable radio spectrum on a first hierarchy level;

receiving a spectrum sharing offer for sharing the portion of the sharable radio spectrum, wherein the spectrum sharing offer is received by a first interface with a first tier network that is prioritized to access the sharable radio spectrum on the first hierarchy level;

receiving a spectrum sharing request for sharing the portion of the sharable radio spectrum, wherein the spectrum sharing request is received by a second interface with a second tier network that is prioritized to access the sharable radio spectrum on a second hierarchy level;

assigning access on the second hierarchy level to the portion of the sharable radio spectrum accessible to the first entity based on a spectrum sharing scheme with respect to the spectrum sharing offer and the spectrum sharing request;

enabling a second entity for accessing the portion of the sharable radio spectrum on the second hierarchy level; and combining the sharable radio spectrum with other types of spectrum including unlicensed spectrum, any type of White Space spectrum, licensed spectrum and/or spectrum under license-by-rule regime based on multiple identical or distinct hierarchy levels and to enable a third entity for accessing the combined radio sharable spectrum.

20. The method of claim 19, wherein the spectrum sharing scheme is based on an auction with respect to the spectrum sharing offer and the spectrum sharing request.

21. The method of claim 20, wherein the auction is based on an amount of available spectrum indicated by the spectrum sharing offer and an amount of requested spectrum indicated by the spectrum sharing request.

* * * * *